United States Patent
Mukhopadhyay et al.

(10) Patent No.: US 11,677,910 B2
(45) Date of Patent: *Jun. 13, 2023

(54) COMPUTER IMPLEMENTED SYSTEM AND METHOD FOR HIGH PERFORMANCE VISUAL TRACKING

(71) Applicant: Board of Supervisors of Louisiana State University and Agricultural and Mechanical College, Baton Rouge, LA (US)

(72) Inventors: Supratik Mukhopadhyay, Baton Rouge, LA (US); Saikat Basu, Baton Rouge, LA (US); Malcolm Stagg, Baton Rouge, LA (US); Robert Dibiano, Baton Rouge, LA (US); Manohar Karki, Baton Rouge, LA (US); Jerry Weltman, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/001,049

(22) Filed: Aug. 24, 2020

(65) Prior Publication Data
US 2020/0389625 A1 Dec. 10, 2020

Related U.S. Application Data

(63) Continuation of application No. 14/047,833, filed on Oct. 7, 2013, now Pat. No. 10,757,369.

(60) Provisional application No. 61/798,182, filed on Mar. 15, 2013, provisional application No. 61/728,126, filed on Nov. 19, 2012, provisional application No. 61/711,102, filed on Oct. 8, 2012.

(51) Int. Cl.
*H04N 7/18* (2006.01)

(52) U.S. Cl.
CPC ..................................... *H04N 7/18* (2013.01)

(58) Field of Classification Search
CPC ..................... H04N 7/18; H04N 7/181; G06T 2207/10016; G06T 2207/10024; G06T 7/194; G06T 7/246
See application file for complete search history.

(56) References Cited

U.S. PATENT DOCUMENTS

| 5,341,142 A * | 8/1994 | Reis ....................... F41G 7/2293 |
| | | 342/63 |
| 7,317,826 B2 * | 1/2008 | Wilensky ................ G06V 10/56 |
| | | 382/162 |

(Continued)

OTHER PUBLICATIONS

M. Piccardi "Background subtraction techniques: a review" 2004 IEEE International Conference on Systems, Man and Cybernetics (Year: 2004).*

(Continued)

*Primary Examiner* — Richard A Hansell, Jr.
(74) *Attorney, Agent, or Firm* — Thomas | Horstemeyer, LLP

(57) ABSTRACT

The present disclosure presents a computer implemented system and method of tracking objects and motion in video, detecting and analyzing periodic motion, and identifying motion characteristics of an activity or event using periodic motion data.

20 Claims, 6 Drawing Sheets

(56) References Cited

U.S. PATENT DOCUMENTS

| | | | | |
|---|---|---|---|---|
| 7,861,304 B1* | 12/2010 | Nachenberg | G06F 21/564 | 713/188 |
| 8,265,392 B2* | 9/2012 | Wang | G06T 7/174 | 382/173 |
| 8,516,456 B1* | 8/2013 | Starovoitov | G06F 9/3802 | 717/141 |
| 9,197,891 B1* | 11/2015 | Namboodiri | H04N 19/513 | |
| 9,659,380 B1* | 5/2017 | Castellani | H04N 5/145 | |
| 2004/0252889 A1* | 12/2004 | Liu | G06V 20/64 | 382/154 |
| 2005/0001759 A1* | 1/2005 | Khosla | G01S 13/726 | 342/195 |
| 2005/0105764 A1* | 5/2005 | Han | G06V 10/24 | 340/5.1 |
| 2005/0265582 A1* | 12/2005 | Buehler | G06T 7/254 | 348/E7.086 |
| 2007/0070038 A1* | 3/2007 | Hoffberg | H04N 21/44222 | 345/156 |
| 2007/0291984 A1* | 12/2007 | Yang | G06T 7/20 | 382/103 |
| 2008/0114710 A1* | 5/2008 | Pucher | G06N 20/00 | 706/20 |
| 2008/0130948 A1* | 6/2008 | Ozer | G06V 20/52 | 382/103 |
| 2008/0240497 A1* | 10/2008 | Porikli | G06T 7/20 | 382/103 |
| 2009/0087029 A1* | 4/2009 | Coleman | G06V 10/255 | 382/103 |
| 2009/0112564 A1* | 4/2009 | Schmieder | G06F 30/3323 | 703/21 |
| 2010/0083056 A1* | 4/2010 | Spier | G06F 11/079 | 714/E11.024 |
| 2011/0150285 A1* | 6/2011 | Kimura | H04B 10/1141 | 382/103 |
| 2011/0205359 A1* | 8/2011 | Lee | G08B 13/19676 | 348/143 |
| 2012/0045090 A1* | 2/2012 | Bobbitt | G06T 7/20 | 382/103 |
| 2012/0062736 A1* | 3/2012 | Xiong | G06F 3/0425 | 382/199 |
| 2012/0170804 A1* | 7/2012 | Lin | G06T 7/248 | 382/103 |
| 2012/0237193 A1* | 9/2012 | Kawarada | G02B 7/34 | 396/95 |
| 2012/0271511 A1* | 10/2012 | Dierks | B60Q 1/143 | 701/36 |
| 2013/0019216 A1* | 1/2013 | Vasudevan | G06F 30/3323 | 716/106 |
| 2013/0039409 A1* | 2/2013 | Gupta | H04N 7/147 | 375/E7.126 |
| 2013/0063556 A1* | 3/2013 | Russell | G06T 7/194 | 348/E13.001 |
| 2013/0088600 A1* | 4/2013 | Wu | H04N 7/18 | 348/149 |
| 2013/0176430 A1* | 7/2013 | Zhu | G06T 7/254 | 348/143 |
| 2014/0064618 A1* | 3/2014 | Janssen, Jr. | G06F 40/211 | 382/182 |
| 2015/0206290 A1* | 7/2015 | Ryu | G06T 7/246 | 382/255 |

OTHER PUBLICATIONS

Chaudry R., A. Ravichandran, G. Hager, and R. Vidal (Histograms of Oriented Optical Flow and Binet-Cauchy Kernels on Nonlinear Dynamical Systems for the Recognition of Human Actions, Computer Vision and Pattern Recognition, 2009, IEEE Conference Jun. 20-25, 2009. doi: 10.1109/CVPR.2009.5206821) (Year: 2009).*

Smith M.J., R. D. Quinn, A. Boxerbaum and G. L. Peterson (Electronic Image Stabilization using Optical Flow with Inertial Fusion, 2010 IEEE RSJ International Conference on Intelligent Robots and Systems, Oct. 18-22, 2010, Taipei, Taiwan) (Year: 2010).*

Guraya et al., People Tracking via a Modified CAMSHIFT Algorithm, Jan. 2009 (obtained via Research Gate—https://www.researchgate.net/publication/228753108_People_Tracking_via_a_Modified_CAMSHIFT_Algorithm) (Year: 2009).*

Cha et al., 'On measuring the distance between histograms', Pattern Recognition, 35 (2002) 1355-1370 (Year: 2002).*

Muddassar A. and K. Meinke IDS: An Incremental Learning Algorithm for Finite Automata, Jun. 13, 2012, (Online). Available: https://arxiv.org/abs/1206.2691 (Year: 2012).*

Lucas, "An Iterative Image Registration Technique With an Application to Stereo Vision", Proceedings of the Seventh International Joint Conference on Artificial Intelligence (IJCAI-81 ), Aug. 24-28, 1981, pp. 674-679.

Ding et al., "K-means Clustering via Principal Component Analysis", Proceedings of the International Conference on Machine Learning, Jul. 31, 2004, pp. 225-232.

Opitz et al., "Popular Ensemble Methods: An Empirical Study", Journal of Artificial Intelligence Research, vol. 11, Aug. 1, 1999, pp. 169-198.

Shi et al., "Good Features to Track", 9th IEEE Conference on Computer Vision and Pattern Recognition, Jun. 21-23, 1994, pp. 593-600.

Bouguet, "Pyramidal Implementation of the Lucas Kanade Feature Tracker: Description of the Algorithm," Intel Corporation, at least as early as Dec. 31, 2000, pp. 1-9.

Huang et al., "Vs-star: A Visual Interpretation System for Visual Surveillance", Pattern Recognition Letters, vol. 31, Issue 14, Oct. 15, 2010, pp. 2265-2285.

L. Rokach, "Ensemble-based classifiers". Artificial Intelligence Review 33 (1-2): 1-39, 2010.

Funk, "A Study of the Kalman Filter Applied to Visual Tracking," University of Alberta, Dec. 7, 2003, pp. 1-26.

P. Kaewtrakulpong and R. Bowden, "An Improved Adaptive Background Mixture Model for Real-Time Tracking With Shadow Detection", Proc. European Workshop Advanced Video Based Surveillance Systems, 2001.

R. Polikar, "Ensemble based systems in decision making" _IEEE Circuits and Systems Magazine 6 (3): 21-45, 2006.

Lan et al., "A Unified Spatio-Temporal Articulated Model for Tracking," Proceedings of the 2004 IEEE Computer Society Conference on Computer Vision and pattern Recognition, Jul. 19, 2004, 8 Pages.

Kalal et al., "P-N Learning: Bootstrapping Binary Classifiers from Unlabeled Data by Structural Constraints," IEEE Computer Society Conference on Computer Vision and Pattern Recognition, Jun. 13-18, 2010, pp. 49-56.

Kim, "Real Time Object Tracking based on Dynamic Feature Grouping with background Subtraction," IEEE Conference on Computer Vision and Pattern Recognition, Jun. 23-28, 2008, pp. 1-8.

"Introduction for VIRAT Video Dataset Release 2.0," obtained from viraldala.org, Sep. 30, 2011, 12 Pages.

Basu et al., "LSU Agile Framework Tracker," retrieved from https://xythos.lsu.edu/users/mstagg3/web/lracker/ on May 28, 2015, 7 Pages.

Chang et al., "Multiple Object Tracking with Kernel Particle Filter," IEEE Computer Society Conference on Computer Vision and Pattern Recognition, Jun. 20-25, 2005, pp. 566-573.

Williams et al., "A Sparse Probabilistic Learning Algorithm for Real-Time Tracking," Proceedings of the 9th IEEE International Conference on Computer Vision, vol. 1, Oct. 13-16, 2003, 8 Pages.

Schapire, "The Boosting Approach to Machine Learning: An Overview," Nonlinear Estimation and Classification, Dec. 19, 2001, pp. 1-23.

Long et al., "Random Classification Noise Defeats All Convex Potential Boosters", In International Conference on Machine Learning, Dec. 22, 2009, pp. 1-18.

Viola et al., "Rapid Object Detection using a Boosted Cascade of Simple Features," IEEE Computer Society Conference on Computer Vision and Pattern Recognition, Dec. 8-14, 2001, pp. 511-518.

(56) References Cited

OTHER PUBLICATIONS

Andriluka et al., "People-Tracking-by-Detection and People-Detection-by-Tracking" IEEE Conference on Computer Vision and Pattern Recognition, Jun. 23-28, 2008, pp. 1-8.
Maggio et al., "Hybrid Particle Filter and Mean Shift Tracker with Adaptive Transition Model," in Proceedings of IEEE International Conference on Acoustics, Speech, and Signal Processing, vol. 2, 4 Pages.
Ross et al., "Incremental Learning for Robust Visual Tracking," International Journal of Computer Vision, vol. 77, No. 1-3, Aug. 17, 2007, pp. 125-141.
Babenko et al., "Visual Tracking with Online Multiple Instance Learning", IEEE Conference on Computer Vision and Pattern Recognition, Jun. 20-25, 2009, pp. 983-990.
Kalal et al., "Online Learning of Robust Object Detectors during Unstable Tracking," IEEE 12th International Conference on Computer Vision Workshops, Sep. 27-Oct. 4, 2009, pp. 1417-1424.
Kalal et al., "Forward-Backward Error: Automatic Detection of Tracking Failures," International Conference on Pattern Recognition, Aug. 23-26, 2010, pp. 23-26.
Kalal et al., "Tracking-Learning-Detection," IEEE Transactions on Pattern Analysis and Machine Intelligence, vol. 6, No. 1, Jan. 31, 2010, pp. 1-14.
Crivelli et al., "Mixed-Slate Markov Models in Image Motion Analysis", Springer, Book Chapter in Machine Learning for Vision-Based Motion Analysis, Springer, at least as early as Dec. 31, 2011, pp. 77-115.
Lombardi et al., "Learning to Detect Event Sequences in Surveillance Streams at Very Low Frame Rate", Springer, at least as early as Dec. 31, 2011, pp. 117-144.
Xiaoyu Wang, Gang Hua, and Tony X. Han, "Discriminative Multiple Target Tracking", Book Chapter in Machine Learning for Vision-Based Motion Analysis, Springer, 2011.
Fan et al., "Video-Based Human Motion Estimation by Part-Whole Gait Manifold Learning", Book Chapter in Machine Learning for Vision-Based Motion Analysis, Springer, at least as early as Dec. 31, 2011, 47 Pages.
Comaniciu et al., "Real-Time Tracking of Non-Rigid Objects Using Mean-Shift," IEEE Conference on Computer Mision and Pattern Recognition, Jun. 15, 2000, 8 Pages.
Ahad et al., "Motion History Image: its Variants and Applications," Machine Vision and Applications, vol. 23, Issue 2, Mar. 31, 2012, pp. 255-281.
Bui, "A General Model for Online Probabilistic Plan Recognition," Proceedings of the 18th International Joint Conference on Artificial Intelligence, Aug. 31, 2003, pp. 1309-1315.
Chuang et al., "Suspicious Object Detection and Robbery Event Analysis," 16th International Conference on Computer Communications and Networks, Aug. 13-16, 2007, pp. 1189-1192.
"VIRAT Video Dataset," retrieved from http://www.viratdata.org on May 28, 2015, 2 Pages.
Giordano et al., "Reasoning about Actions in Dynamic Linear Time Temporal Logic," Logic Journal of the IGPL, vol. 9, No. 2, Mar. 31, 2001, pp. 289-303.
Kautz, "A Formal Theory of Plan Recognition," University of Rochester, May 31, 1987, 197 Pages.
Kreutzmann et al., "On Process Recognition by Logical Inference," Proceedings of the European Conference on Mobile Robots, at least as early as Dec. 31, 2011, pp. 1-6.
Junejo, I., Dexter, E., Laptev, I., P'erez, P.,2008. Cross-view action recognition from temporal self-similarities. In: Forsyth, D., Torr, P., Zisserman, A. (eds.) ECCV 2008, Part II LNCS, vol. 5303, pp. 293-306.
Pnueli, "The Temporal Logic of Programs," Proceedings of the 18th Annual Symposium on Foundations of Computer Science, Oct. 31-Nov. 2, 1977, pp. 46-57.
Poole et al., "Logic Programming, Abduction and Probability: A Top-Down Anytime Algorithm for Estimating Prior and Posterior Probabilities," New Generation Computing, vol. 11, No. 3-4, Mar. 17, 1993, pp. 377-400.

Raghavan et al., "Abductive Plan Recognition by Extending Bayesian Logic Programs," Springer, at least as early as Dec. 31, 2011, pp. 629-644.
Shao et al., "Human Action Segmentation and Recognition via Motion and Shape Analysis, Pattern Recognition Letters," Pattern Recognition Letters, vol. 33, May 30, 2011, pp. 438-445.
Zhou et al., "Object Tracking in an Outdoor Environment using Fusion of Features and Cameras," Image and Vision Computing, vol. 24, Jun. 7, 2005, pp. 1244 1255.
H. Kautz. "A formal theory of plan recognition". In PhD thesis, University of Rochester, 1987.
Hagar, G., Belhumeur, P.: Efficient Region Tracking With Parametric Models of Geometry and Illumination, IEEE Transactions on Pattern Analysis and Machine Intel- ligence vol. 20 No. 10: pp. 1125-1139.
Zeng et al., "Knowledge Based Activity Recognition with Dynamic Bayesian Network," European Conference on Computer Vision, Sep. 5-11, 2010, pp. 532-546.
Tran et al., "Event Modeling and Recognition using Markov Logic Networks," European Conference on Computer Vision, Oct. 12-18, 2008, pp. 610-623.
Laptev et al., "Learning Realistic Human Actions from Movies," IEEE Conference Computer Vision and Pattern Recognition, Jun. 23-28, 2008, pp. 1-8.
Shah et al., "Human Action Recognition in Videos Using Kinematic Features and Multiple Instance Learning," IEEE Fransactions on Pattern Analysis and Machine Intelligence, vol. 32, Nov. 13, 2008, pp. 1-16.
Hopcroft et al., "Introduction to Automata Theory, Languages, and Computation," Pearson Addison-Wesley, at east as early as Dec. 31, 2001, 537 Pages.
Schuldt et al., "Recognizing Human Actions: A Local SVM Approach," International Conference on Pattern Recognition, 2004, Aug. 26, 2004, pp. 32-36.
Niebles et al., "Unsupervised Learning of Human Action Categories Using Spatial-Temporal Words," International Journal of Computer Vision, Dec. 26, 2007, 20 Pages.
"Formal Concept Analysis Homepage," retrieved from http://www.upriss.org.uk/fca/fca.html on May 28, 2015, at least as early as Dec. 31, 2007, 2 Pages.
Ramakrishnan, "Magic Templates: A Spellbinding Approach to Logic Programs," Journal of Logic Programming, vol. 11, Issues 3-4, Oct.-Nov. 1991, pp. 189-216.
Bryant, "Graph-Based Algorithms for Boolean Function Manipulation," IEEE Transactions on Computers, vol. C-35, No. 8, Aug. 31, 1986, pp. 677-691.
Chou et al., "The Implementation of a Model-based Belief Revision System," ACM SIGART Bulletin, vol. 2, No. 3, Jun. 31, 1991, pp. 28-34.
L. de Alfaro, T. A. Henzinger and 0. Kupferman. "Concurrent Reachability Games". In Proceedings of FOCS 1998: 564-575.
Xia et al., "An Event Driven Integration Reasoning Scheme for Handling Dynamic Threats in an Unstructured Environment," Artificial Intelligence, vol. 95, Issue 1, Aug. 31, 1997, pp. 169-186.
Vert et al., "Defining a New Type of Global Information Architecture for Contextual Information Processing," IKE 2009, Jul. 13-16, 2009, 6 Pages.
Brewka et al., "Nonmonotonic Reasoning," Elsevier, at least as early as Dec. 31, 2007, pp. 1-45.
Console et al., "A Spectrum of Logical Definitions of Model-Based Diagnosis," Computational Intelligence, vol. 7, Issue 3, Aug. 31, 1991, pp. 133-141.
Khardon et al., "Learning to Reason," Journal of the ACM, vol. 44, No. 5, Sep. 31, 1997, pp. 0-27.
Valiant, "Robust Logics," Artificial Intelligence, vol. 117, Issue 2, Mar. 31, 2000, pp. 231-253.
Ryvkina et al., "Revision Processing in a Stream Processing Engine: A High-Level Design" International Conference on Data Engineering, Apr. 3-7, 2006, 3 Pages.
Agrawal et al., "Efficient Pattern Matching over Event Streams," Association for Computing Machinery, Jun. 9-12, 2008, 13 Pages.

(56) References Cited

OTHER PUBLICATIONS

Chandy et al., "Towards a Theory of Events," Inaugural International Conference on Distributed Event-Based Systems, Jun. 20-22, 2007, 8 Pages.
Luckham, "The Power of Events :An Introduction to Complex Event Processing in Distributed Enterprise Systems," Addison Wesley, 2002.
Seireo et al., "Design and Implementation of an ECA Rule Markup Language". Springer Verlag. (Oct. 24, 2005).
"The Yices SMT Solver", Yices2, retrieved from yices.csl.sri.com on May 25, 2015, 2 pages.
Wang et al., Efficient Data Structures for Model-Based 3-D Object Recognition and Localization from Range Images. IEEE Transactions on Pattern Analysis and Machine Intelligence, vol. 14, No. 10, Oct. 31, 1992, pp. 1035-1045.
Krishnamurthy et al., "Topographic-Based Feature Labeling for Infrared Oceanographic Images," Pattern Recognition Letters, vol. 14, Nov. 31, 1993, pp. 915-925.
Wu et al., "A New Generalized Computational Framework for Finding Object Orientation Using Perspective Trihedral Angle Constraint," IEEE Transactions on Pattern Analysis and Machine Intelligence, vol. 16, No. 10, Oct. 31, 1994, pp. 961-975.
Data Distribution Service—Wikipedia, the free Encyclopedia: http://en.wikipedia.org/wiki/Data_Distribution_Service.
"Security Analytics: Web TAS 3.0," retrieved from http://securityanalytics.blogspol.com/2007 /12/webtas-30.html, Dec. 14, 2007, 5 Pages.
La Torre et al., "Optimal-Reachability and Control for Acyclic Weighted Timed Automata," IFIP TCS, at least as early as Dec. 31, 2002, pp. 1-13.
Peralta et al., "A Formal Framework for Developing High Assurance Event Driven Service-Oriented Systems," High Assurance Web Services, Springer Verlag, May 29, 2009, pp. 145-162.
"Northrop Grumman Acquires Proprietary Software from Tucana Technologies," Northrop Grumman Corp., retrieved from http://www.globenewswire.com/newsroom/news.html?d=86459, Sep. 21, 2005, 3 Pages.
Balemi, "Control of Discrete Event Systems: Theory and Application," Swiss Federal Institute of Technology, May 31, 1992, 125 Pages.
Iyengar et al., "Distributed Sensor Networks", Chapman & Hall, at least as early as Dec. 31, 2005, pp. 18-19.
Simhadri et al., "Wavelet-Based Feature Extraction from Oceanographic Images," IEEE Transactions on Geoscience and Remote Sensing, vol. 36, No. 3, May 31, 1998, pp. 767-778.
Kahneman et al., "Prospect Theory: An Analysis of Decision under Risk", Econometrica, vol. 47, No. 2, Mar. 31, 1979, pp. 263-291.
Antoniou, "A Tutorial on Default Logics", ACM Computing Surveys, vol. 31, No. 3, Sep. 30, 1999, pp. 337-359.
Boehman, "Section 3.6: Nonmonotonic Inference and its Kinds," Epistemic States, at least as early as Dec. 31, 2001, 1 Page.
Schuldt et al., "Recognizing Human Actions: A Local SVM Approach", Proceedings of the 17th International Conference on Pattern Recognition, Aug. 26, 2004, 5 Pages.
Iyengar et al., "Distributed Sensor Networks", Chapman & Hall/CRC Computer and Information Science Series.
Chaudry et al., "Histograms of Oriented Optical Flow and Binet-Cauchy Kernels on Nonlinear Dynamical Systems for the Recognition of Human Actions," Computer Vision and Pattern Recognition, 2009, IEEE Conference Jun. 20-25, 2009.
Smith et al., "Electronic Image Stabilization using Optical Flow with Inertial Fusion," IEEE RSJ International Conference on Intelligent Robots and Systems, Oct. 18-22, 2010, 8 Pages.
Guraya et al., "People Tracking via a Modified CAMSHIFT Algorithm," obtained via Research Gate—https://www.researchgate.net/publication/228753108_People_Tracking_via_a_Modified_CAMSHIFT_Algorithm, Jan. 31, 2009, 6 Pages.
Cha et al., "On Measuring the Distance Between Histograms," Pattern Recognition, vol. 35, Jun. 4, 2001, pp. 1355-1370.
Muddassar et al., "IDS: An Incremental Learning Algorithm for Finite Automata," retrieved from https://arxiv.org/abs/1206.2691, Jun. 13, 2012, pp. 1-8.
Piccardi, "Background Subtraction Techniques: A Review," 2004 IEEE International Conference on Systems, Man and Cybernetics, Oct. 10-13, 2004, pp. 3099-3104.
D. Luckham: The Power of Events :An Introduction to Complex Event Processing in Distributed Enterprise Systems, Addison Wesley, 2002.
Ivan Laptev, "Local Spatio-Temporal Image Features for Motion Interpretation" (2004), PhD Thesis, Jun. 11, 2004 at Computational Vision and Active Perception Laboratory (CVAP), NADA, KTH, Stockholm.
Mikael Berndtsson, Marco Seirio (Oct. 24, 2005). "Design and Implementation of an EGA Rule Markup Language" Springer Verlag.
Iyengar, S.S., Brooks, "Distributed Sensor Networks", Microsensor Applications, pp. 18-19.
Tao et al., "Object Tracking with Bayesian Estimation of Dynamic Layer Representations," IEEE Transactions on Pattern Analysis and Machine Intelligence, vol. 24, No. 1, Jan. 31, 2002, pp. 75-89.
Choi et al., "A Unified Framework for Multi-target Tracking and Collective Activity Recognition," Computer Vision—ECCV 2012, Part 4, Oct. 31, 2012, pp. 215-230.
Oltramari et al., "Using Ontologies in a Cognitive-Grounded System: Automatic Action Recognition in Video Surveillance," Dec. 31, 2013.
Butt et al., "Multiple Target Tracking using Frame Triplets," Asian Conference on Computer Vision, Nov. 31, 2012, 14 Pages.
Ess, A., Leibe, B., Schindler, K., van Gool, L.: A mobile vision system for robust multi-person tracking. In: IEEE Conference on Computer Vision and Pattern Recognition (CVPR'08), IEEE Press (2008).
Wu et al., "Tracking of Multiple, Partially Occluded Humans based on Static Body Part Detection," IEEE Conference an Computer Vision and Pattern Recognition, vol. 1, Jun. 17-22, 2006, pp. 951-958.
Zhang et al., "Global Data Association for Multi-Object Tracking Using Network Flows," CVPR 2008, Jun. 23-28, 2008, pp. 1-8.
Brendel et al., "Multiobject Tracking as Maximum Weight Independent Set," IEEE Conference on Computer Vision and Pattern Recognition, Jun. 20-25, 2011, pp. 1273-1280.
Song et al., "A Stochastic Graph Evolution Framework for Robust Multi-Target Tracking," Springer: Computer Vision—ECCV 2010, vol. 6311, Sep. 5-11, 2010, pp. 1-14.
Berclaz et al., "Multiple Object Tracking using K-Shortest Paths Optimization," IEEE Transactions on Pattern Analysis and Machine Intelligence, vol. 33, Issue 9, Sep. 31, 2011, pp. 1806-1819.
Moreno-Noguer F., Sanfeliu A., Samaras D.: Dependent multiple cue integration for robust tracking. Pattern Analysis and Machine Intelligence, IEEE Transactions 30(4) (2008) 670-685.
"Scalaris, a Distributed, Transactional Key-Value Store," retrieved from hllps://github.com/scalaristeam/scalaris on May 28, 2015, 2 Pages.
Smith et al., "Evaluating Multi-Object Tracking," IEEE Computer Society Conference on Computer Vision and Pattern Recognition, Sep. 21-23, 2005, 8 Pages.
M. Woolridge, "An Introduction to MultiAgent Systems", John Wiley, 2002.
Iyengar et al., "Preventing Future Oil Spills with Software- Based Event Detection" IEEE Computer Society, vol. 43, Issue 8, Aug. 31, 2010, pp. 95-97.
Vapnik et al., "Learning Using Hidden Information", Proceedings of International Joint Conference on Neural Networks, Jun. 14-19, 2009, pp. 3188-3195.
Bharadwaj et al., "A Formal Approach to Developing Reliable Event-Driven Service-Oriented Systems," Annual IEEE International Computer Software and Applications Conference, at least as early as Dec. 31, 2008, pp. 227-230.
"What is Scalaris?" Scalaris, retrieved from http://code.google.eom/p/scalaris/ on May 28, 2015, 1 Page.

(56) References Cited

OTHER PUBLICATIONS

Schwartz et al., "Human Detection Using Partial Least Squares Analysis," Proceedings of the International Conference on Computer Vision, Sep. 27-Oct. 4, 2009, 8 Pages.

Laptev, "Local Spatio-Temporal Image Features for Motion Interpretation" (2004), PhD Thesis, Jun. 11, 2004 at Computational Vision and Active Perception Laboratory (CVAP), NADA, KTH, Stockholm.

Gall et al., "An Introduction to Random Forests for Multi-class Object Detection," LNCS 7474, at least as early as Dec. 31, 2012, pp. 1-21.

Gall et al., "Hough Forests for Object Detection, Tracking, and Action," IEEE Transactions on Pattern Analysis and Machine Intelligence, vol. 33, No. 11, Nov. 31, 2011, pp. 2188-2202.

Xu et al., "Video Event Recognition Using Kernel Methods with Multilevel Temporal Alignment," IEEE Transactions on Pattern Analysis and Machine Intelligence, vol. 30, No. 11, Nov. 31, 2008, pp. 1985-1997.

Niebles et al., "Modeling Temporal Structure of Decomposable Motion Segments for Activity Classification", Proceedings of the 12th European Conference of Computer Vision, vol. 6312, Sep. 5-11, 2010, pp. 392-405.

Fei-Fei et al., "What, Where and Who? Telling the Story of an Image by Activity Classification, Scene Recognition and Object Categorization," Book chapter in "Studies in Computational Intelligence—Computer Vision," vol. 285, Springer, at least as early as Dec. 31, 2010, pp. 1-15.

Morariu et al., "Human Activity Understanding using Visibility Context", IEEE/RSJ IROS Workshop: From sensors to human spatial concepts (FS2HSC), at least as early as Dec. 31, 2007, 8 Pages.

Chellappa et al., "Machine Recognition of Human Activities: A Survey," IEEE Transactions on Circuits and Systems for Video Technology, vol. 18, Issue 11, Nov. 31, 2011, pp. 1473-1488.

Aggarwal et al., "Human Activity Analysis: A Review," ACM Computing Surveys, vol. 43, Issue 3, Apr. 1, 2011, pp. 1-47.

Shah et al., "Automated Visual Surveillance in Realistic Scenarios," IEEE MultiMedia, vol. 14, Issue 1, Jan. 15, 2007, pp. 30-39.

Bollig et al., "The Automata Learning Framework," International Conference on CAV, Jul. 15-19, 2010, 5 Pages.

Muzatko, "Approximate Regular Expression Matching," Proceedings of the Prague Stringologic Club Workshop, at least as early as Dec. 31, 1996, pp. 37-41.

Tesson et al., "Logic Meets Algebra: The Case of Regular Languages," Logical Methods in Computer Science, vol. 3, Issue 1, Feb. 23, 2007, pp. 1-37.

Oh et al., "A Large-Scale Benchmark Dataset for Event Recognition in Surveillance Video," CVPR 2011, Jun. 20-25, 2011, pp. 3153-3160.

"Recognition of Human Actions," retrieved from http://www.nada.kth.se/cvap/actions/, Jan. 18, 2005, 2 pages.

Hoogs et al., "Video Activity Recognition in the Real World," Association for the Advancement of Artificial Intelligence, Jul. 13-17, 2008, pp. 1551-1554.

Basu et al., "An Agile Framework for Real-Time Motion Tracking," IEEE 39th Annual Computer Software and Applications Conference, vol. 3, Jul. 1-5, 2015, pp. 205-210.

Li et al., "Activity Recognition using Dynamic Subspace Angles," CVPR 2011, Jun. 20-25, 2011, pp. 3193-3200.

Choi et al., "Learning Context for Collective Activity Recognition," IEEE Conference on Computer Vision and Pattern Recognition Jun. 20-25, 2011, pp. 3273-3280.

Lin et al., "Human Activity Recognition for Video Surveillance," IIEEE International Symposium on Circuits and Systems, May 18-21, 2008, pp. 2737-2740.

Messing et al., "Activity Recognition using the Velocity Histories of Tracked Keypoints," 2009 IEEE 12th International Conference on Computer Vision, Sep. 29-Oct. 2, 2009, pp. 1-8.

Resendiz et al., "A Unified Model for Activity Recognition from Video Sequences," 2008 19th International Conference on Pattern Recognition, Dec. 8-11, 2008, 12 Pages.

Ryoo et al., "Recognition of Composite Human Activities through Context-Free Grammar based Representation," IEEE Conference on Computer Vision and Pattern Recognition, Jun. 17-22, 2006, 8 Pages.

Gaur et al., "A 'String of Feature Graphs' Model for Recognition of Complex Activities in Natural Videos," 2011 International Conference on Computer Vision, Nov. 30, 2011, 8 Pages.

Jiang et al., "Modeling Scene and Object Contexts for Human Action Retrieval with Few Examples," IEEE Transactions on Circuits and Systems for Video Technology, vol. 21, No. 5, May 31, 2011, pp. 674-681.

Shet et al., "Vidmap: Video Monitoring of Activity with Prolog," IEEE Conference on Advanced Video and Signal Based Surveillance, Sep. 15-16, 2005, pp. 224-229.

Chen et al., "Modeling Human Activities as Speech," IEEE Conference on Computer Vision and Pattern Recognition, Jun. 20-25, 2011, pp. 3425-3432.

Bhargava et al., "Detection of Object Abandonment using Temporal Logic," Machine Vision and Applications, vol. 20, Issue 5, Nov. 31, 2009, pp. 271-281.

\* cited by examiner

COMPUTER IMPLEMENTED SYSTEM AND METHOD FOR HIGH PERFORMANCE VISUAL TRACKING

CROSS-REFERENCE TO RELATED APPLICATIONS

This application claims priority from U.S. Provisional Application Nos. 61/711,102 (Mukhopadhyay et al.), filed Oct. 8, 2012, 61/728,126 (Mukhopadhyay et al.), filed Nov. 19, 2012, and 61/798,182 (Mukhopadhyay et al.), filed Mar. 15, 2013, which are all incorporated herein by reference as if set forth in full below.

STATEMENT OF GOVERNMENT RIGHTS

This invention was made with U.S. Government support under grant W911NF-10-1-0495 awarded by the Army Research Office. The U.S. Government has certain rights in the invention.

BACKGROUND OF THE INVENTION

I. Field of the Invention

The disclosed invention relates to computer implemented systems and methods for tracking the motion of objects in video, detecting patterns in the motion of said objects, and reasoning about said tracked motion and said patterns to identify activities or events.

II. General Background

Computer vision techniques have been researched for many years, and such techniques have been applied to the field of computer video surveillance. However, in our view, existing methods do not reliably track objects across varying environmental or lighting conditions, do not detect abstract patterns of periodic and non-periodic motion, and do not reliably reason about activities or events.

Moreover, existing visual tracking algorithms cannot automatically adapt to changes in lighting conditions, background, types of sensors (infrared vs. visible spectrum) and their dynamics (pan, tilt, zoom, and other motion). Similarly, they cannot gracefully handle data that simultaneously contains different types of motions such as both slow and fast moving objects, periodic and non-periodic motion, track-based and articulated activities, and motion that results in an occluded object. Also, many of the existing tracking algorithms cannot start the tracking process automatically, as they require a user to draw a box on an object that needs to be tracked for the process to be initiated.

Similarly, in our view, existing techniques do not reliably detect abstract patterns of motion. Some techniques require a large amount of training data for good performance (which training data may not be available in all circumstances). Thus, in our view, there exists no uniform framework that can be efficiently applied to a wide class of problems and can be seamlessly integrated with reasoning platforms to provide inferences at a higher level of abstraction.

SUMMARY OF THE INVENTION

The disclosed invention includes computer implemented systems and methods for tracking the motion of objects in video, detecting patterns in the motion of said objects, and reasoning about said tracked motion and said patterns to identify activities or events. As such, one aspect of the disclosed invention is an agile framework for real-time visual tracking, including an ensemble algorithm for switching between a number of object tracking algorithms. Other aspects of the disclosed invention also include computer implemented methods for extracting patterns from the position of tracked objects as a pattern string, extracting patterns of articulated motion as a pattern string using directional histograms, building finite state automatons, converting finite state automatons to regular expressions, comparing said pattern strings to said regular expressions to identify patterns of motion, and reasoning about said tracked objects and said patterns of activity using linear temporal logic, abductive reasoning, and Bayesian statistical methods to identify activities.

Embodiments of the invention are implemented using computers, including, without limitation, server computers and terminals, which may be networked. Each computer of a network may include one or more processors such as a microprocessor, microcontroller, logic circuitry or the like. The processor or processors may include a special purpose processing device such as an ASIC, PAL, PLA, PLD, Field Programmable Gate Array, or other customized programmable device. Each computer may also include a memory such as volatile or non-volatile memory, static RAM, dynamic RAM, ROM, CD-ROM, disk, tape, magnetic, optical, flash memory, or other computer storage medium. The processor or processors may include L1, L2, or L3 cache, or other memory. Values calculated by the processor or processors may be stored in memory, whether memory included as part of the processor package or otherwise. It is understood that the computer may run software that is stored in such a computer readable medium. The computer may also include various input devices and/or output devices. The input device(s) may include a keyboard, mouse, touch screen, light pen, tablet, microphone, sensor, magnetic stripe reader (including, without limitation, a credit or debit card magnetic stripe reader) or other input hardware with accompanying firmware and/or software. The output device(s) may include a printer, monitor, speakers, or other output hardware with accompanying firmware and/or software.

Suitable networks for configuration and/or use as described herein include one or more local area networks, wide area networks, metropolitan area networks, ham radio networks, and/or Internet Protocol networks such as the World Wide Web, a private Internet, a secure Internet, a value-added network, a virtual private network, an extranet, an intranet, closed circuit television network, or even stand-alone machines which communicate with other machines by physical transport of media. In particular, a suitable network may be formed from parts or entireties of two or more networks of the same or differing type or which using disparate hardware and network communication technologies A network may incorporate wired or land line communication such as Ethernet over twisted pair, T-carrier, or other wired communications technologies. A network may also incorporate wireless communications technologies such as GPRS, EDGE, EV-DO, HSPA, HSDPA, and technologies based on the IEEE 802.11 set of standards.

The network may include communications or networking software such as software available from Novell, Microsoft, Artisoft and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission technologies and methods known to those of skill in the art. The network may encompass smaller networks and/or be connectable to other networks through a gateway or similar mechanism.

Suitable networks can include a server and several clients; other suitable networks may contain other combinations of servers, clients, and/or peer-to-peer nodes, and a given computer may function both as a client and as a server. Each network can include one or more computers, such as the server and/or clients. A computer may be a workstation, laptop computer, disconnectable mobile computer, server, mainframe, cluster, so-called "network computer" or "thin client", a computing appliance, mobile telephone, smartphone, personal digital assistant or other hand-held computing device, "smart" consumer electronics device, or a combination thereof.

Aspects of certain of the embodiments described herein are illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data stricture, etc., which performs one or more tasks or implements particular data structures.

In certain embodiments, a particular software module may comprise disparate instructions stored in different locations of a memory device, which together implement the described functionality of the module. A module may comprise a single instruction or many instructions, and may be distributed over several different code segments, among different programs, and across several memory devices. Some embodiments may be practiced in a distributed computing environment where tasks are perforated by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools including, but not limited to, XML, Java, Javascript, Python, PHP, Pascal, COBOL C++, C, R, Matlab, Mathematica, Weka, Redis, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Additional features and advantages are realized through the techniques of the present invention. Other embodiments and aspects of the invention are described in detail herein and are considered a part of the invention. For a better understanding of the invention with advantages and features, refer to the description and the drawings.

The disclosed invention may be understood as a computer system for tracking motion in a video system comprising a computer containing a plurality of software modules, a camera, and an alarm, wherein said camera and said alarm are operatively connected to said computer, and wherein said plurality of software modules further comprise: (1) an image receiving module that receives images from a video stream, (2) an object tracking module that produces a tracked path, and (3) a track identification module that performs a comparison of said tracked path to a model, wherein said computer system has the capability to invoke said alarm based on said comparison.

BRIEF DESCRIPTION OF THE DRAWINGS

The foregoing and other objects, features, and advantages of the invention are apparent from the following detailed description taken in conjunction with, the accompanying drawings in which like parts are given like reference numerals and, wherein.

DETAILED DESCRIPTION

The disclosed invention is a system and method for tracking the motion of objects in video, detecting patterns in the motion of said objects, and reasoning about said tracked motion and said patterns to identify activities or events.

Figure 1:
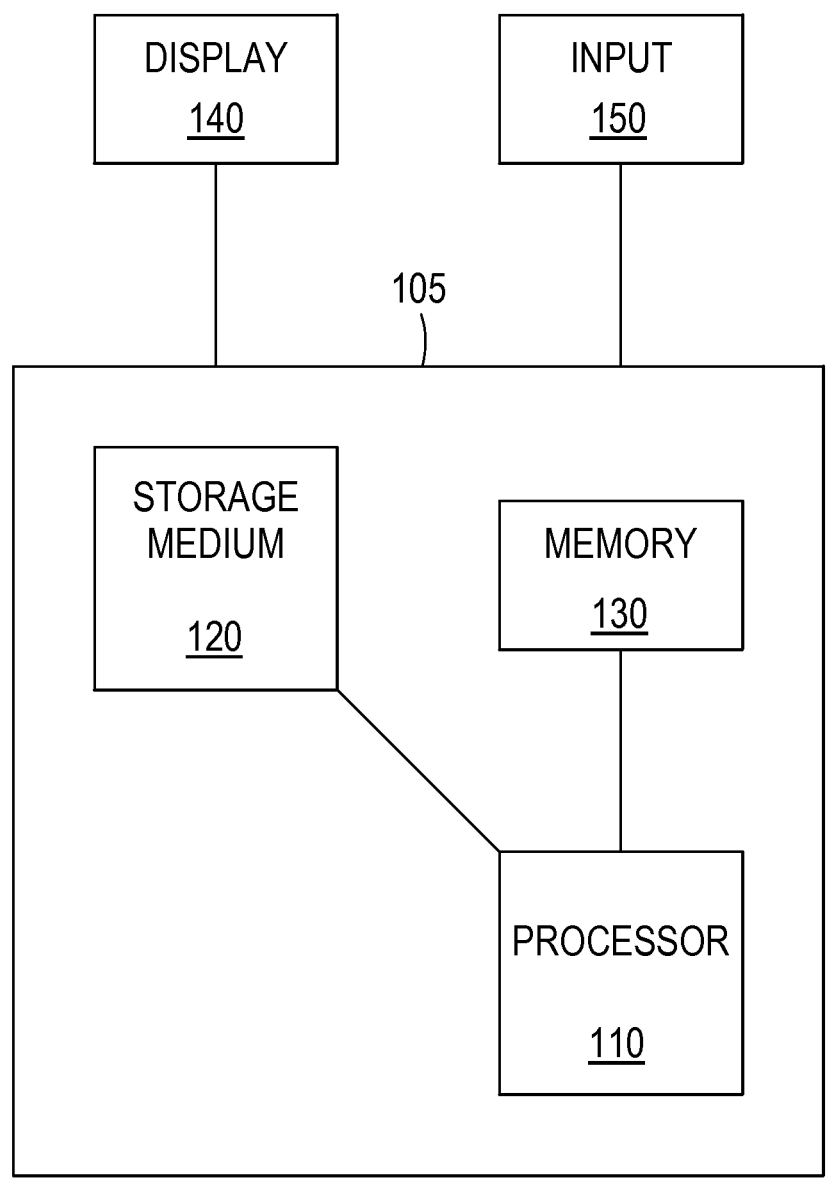
FIG. 1 is a block diagram depicting a computer system for performing methods of the disclosed invention.

FIG. 1 illustrates analysis system 100, which includes a computer system 105 containing a processor 110, a storage medium 120, memory 130, display 140, and input 150. Processor 110 is a processor utilizing any suitable architecture, including a microarchitecture, examples of such being an Intel Core i7 brand microprocessor or other processor supporting the x86, x86-64, IA-32, or IA-64 architectures or their equivalent; or an Apple A6 processor or other processor supporting the ARM architecture or its equivalent. Storage medium 120 may be any computer storage medium including, without limitation, a hard disk, a solid state disk (SSD) (e.g., flash memory), a CD-ROM drive and disk, or removable USB storage (including, but not limited, to a "flash" drive). Memory 130 is RAM or random access memory and is used in the operation of computer system 105. Display 140 is any suitable output device including, without limitation, a liquid crystal display, cathode ray tube display, or other video display. Display 140 may also be any type of output device, including, without limitation, any visual or non-visual display technology such as printers, refreshable braille displays, speakers, and other devices for non-visual communication. Input 150 may be any: suitable input device, or combinations of input devices, including, without limitation, a capacitive or resistive touch screen, a microphone, a mouse, a keyboard, an infrared or visible spectrum camera, or any other device, capable of receiving or collecting information. Analysis system 100 may comprise par or all of one or more computer systems 105, together embodying a single analysis system 100. Computer system 105 may be a desktop computer, a rack-mountable or other server (whether suitable for a home, office, enterprise, or data center environment), or a mobile or tablet computing device such as an iPhone, iPad, Android, or Windows Mobile based computing device or other suitable computing device. Computer system 105 may also be a combination of any number of such computers connected by means of any suitable network or combinations of networks. Computer system 105 contains a computer program product comprising a storage medium 120 having a computer readable or usable program, wherein said computer readable program, when executed on a computer, causes the computer to perform functions described herein. Said computer readable or usable program may be non-compiled computer source code (such as for use with an interpreter or just-in-time compiler), compiled object code, assembly code, or any combination thereof.

Figure 2:
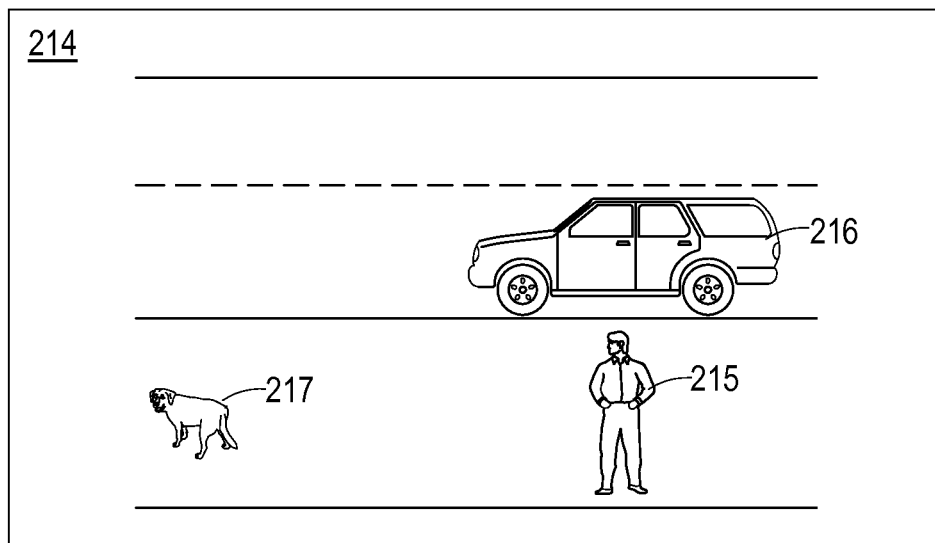
FIG. 2 is a block diagram depicting a computerized video surveillance system.
Figure 2:
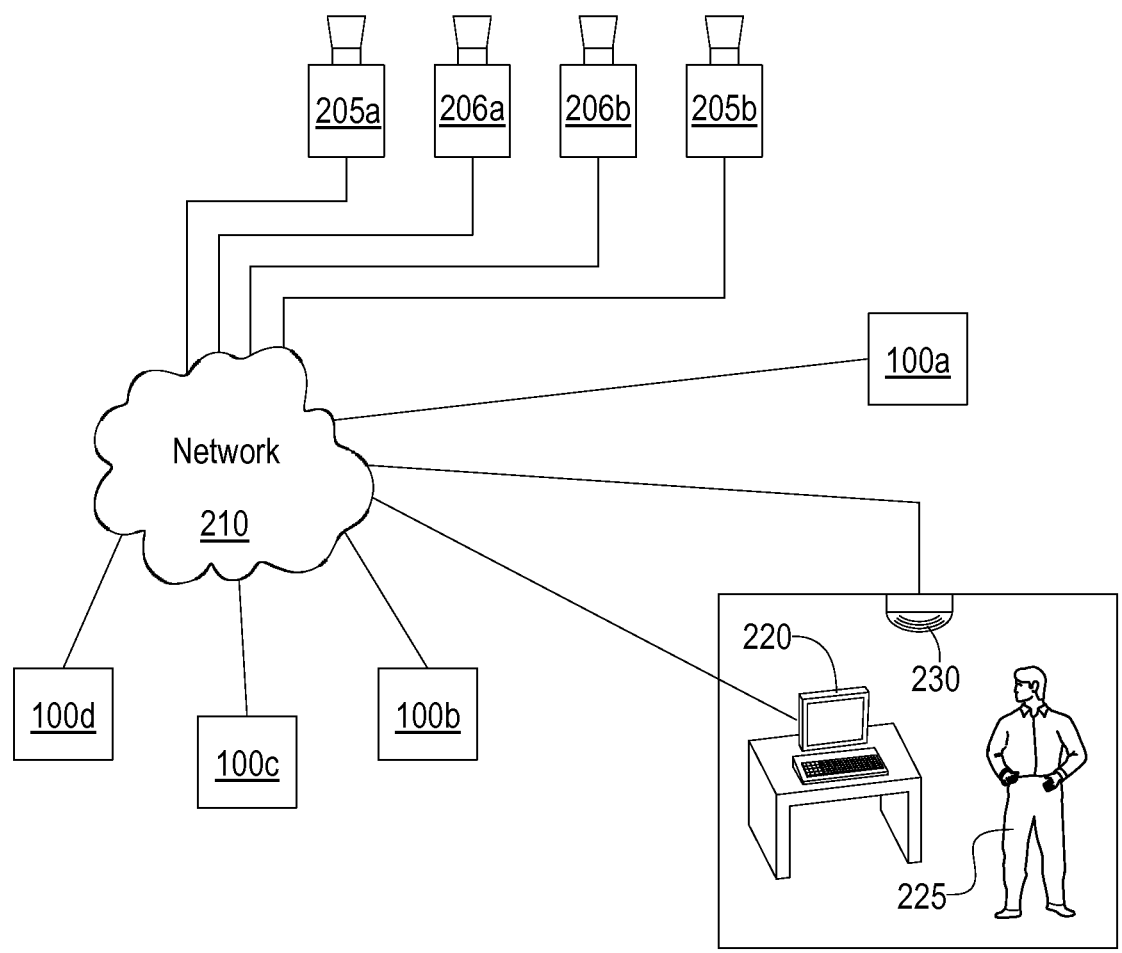

FIG. 2 illustrates surveillance system 200. Surveillance system 200 contains cameras 205a-205b, infrared cameras 206a-206b, analysis systems 100a, 100b, 100c, and 100d, area 214 (as shown containing person 215, automobile 216, and animal 217), network 210, terminal 220, operator 225, and alarm 230. Cameras 205a-205b are video cameras capable of receiving light in the visible spectrum and converting said light into a series of rasterized images infrared cameras 206a-206b are video cameras capable of receiving light in the infrared spectrum and converting said light into a series of rasterized images.

Each rasterized image contains a set of pixels, each pixel having x and y coordinates corresponding to said pixel's location in a regular two-dimensional grid approximately representing the viewing plane. Also, each pixel is associated with a color value (a numerical representation of color in a color space such as industry standard RGB or CMYK color spaces) or with a light intensity value (i.e., where monochrome).

Area 214 is a location in which person 215, automobile 216, or animal 217 may be visible to one or more cameras 205a-205b and infrared cameras 206a-206b. Network 210 is any suitable computer network. In an exemplary embodiment, network 210 is an Ethernet network using Internet Protocol, Terminal 220 is a computer system capable of receiving and displaying a stream of video data to operator 225. In an exemplary embodiment, terminal 220 can display video data from cameras 205a-205b and infrared cameras 206a-206b. Alarm 230 is a device capable of displaying a visible or audible message or alarm. Cameras 205a-205b, infrared cameras 206a-206b, analysis systems 100a, 100b, 100c, and 100d, terminal 220, and alarm 230 are all connected to network 210. In an exemplary embodiment, each camera 205a-205b and infrared camera 206a-206b is associated with one analysis system 100a-100d.

Operator 225 is a human who may be tasked with watching, supervising, or guarding area 214 in exemplary embodiments of the disclosed invention, analysis systems 100a-100d analyze video from cameras 205a-205b and infrared cameras 206a-206b to detect activities of a person 215, an automobile 216, or an animal 217. As a result of detecting certain activities, analysis systems 100a-100d may alert operator 225 via alarm 230, terminal 220, or both terminal 220 and alarm 230. All of said video data and activities may be recorded on one or more analysis systems 100a-100d.

Figure 3:
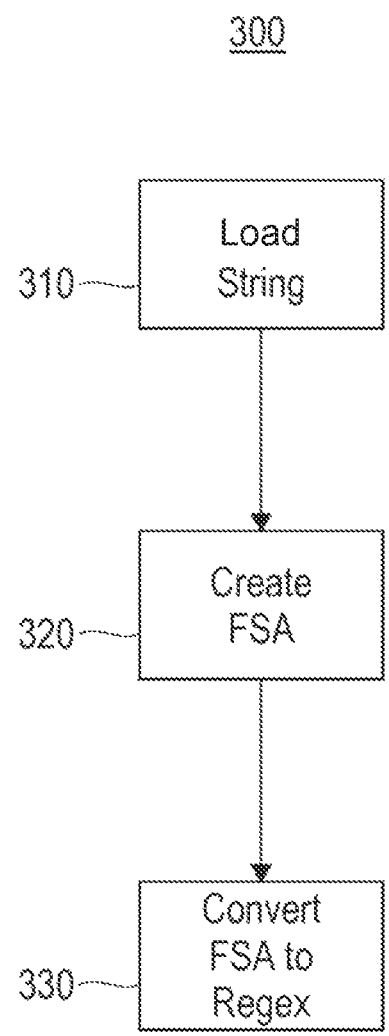
FIG. 3 is a flow chart illustrating a method of building a model.

FIG. 3 illustrates model building method 300 and is comprised of exemplar loading step 310, automaton creating step 320, and regex (regular expression) converting step 330. In model building method 300, analysis system 100 builds models which can be compared to novel patterns in order to determine whether a novel pattern is a certain type of pattern. As further described below, the disclosed invention encodes patterns of motion as strings in an exemplary embodiment, object tracking movement may occur in the following directions: East (right), Northeast (up and right), North (up), Northwest (up and left), West (left), Southwest (down and left), South (down), Southeast (down and right), and each direction is mapped into a character (respectively, a, b, c, d, e, f, g, and h). Parenthetical directions illustrate movement in a two dimensional viewing plane orthogonal to the viewer; and cardinal and ordinal directions correspond to the same viewing plane when viewed from above. So, if an object moves North (up), North (up), Northeast (up and right), East (right), then this pattern is mapped into the string, "ccba." The directions described are used for convenience and do not necessarily directly correspond to directions of movement of tracked objects, but rather represent relative motion as perceived or interpreted by the disclosed invention.

In exemplar loading step 310, analysis system 100 loads one or more strings which represent examples of a particular pattern of motion (i.e., positive exemplars), as well as one or more strings which do not represent examples of said pattern of motion (i.e., negative exemplars).

In automaton creating step 320, analysis system 100 uses the RPM (Regular Positive Negative Inference) offline learning algorithm to create (learn) a finite state automaton (FSA) representing the regular grammar that accepts strings belonging to a language defined by the strings loaded in exemplar loading step 314. Said FSA is stored in memory 130.

In regex converting step 330, analysis system 100 uses the JFLAP (Formal Language & Automata Package, available at http://www.jflap.org) library to convert said FSA created by automaton creating step 320 into a regular expression. Said regular expression is stored in memory 130.

A regular expression is an expression that specifies a set of strings using rules which may be more concise than lists of a set's members, and regular expressions are commonly used in many computer systems to perform pattern matching tasks on strings (e.g., to determine if a string is a valid email address, a phone number, or other more complicated pattern matching tasks). The regular expressions generated in regex converting step 330 are used in other aspects of the disclosed invention to detect patterns of motion. That is, novel patterns of motion are mapped into strings and compared to regular expressions according to regex comparison method 400.

Figure 4:
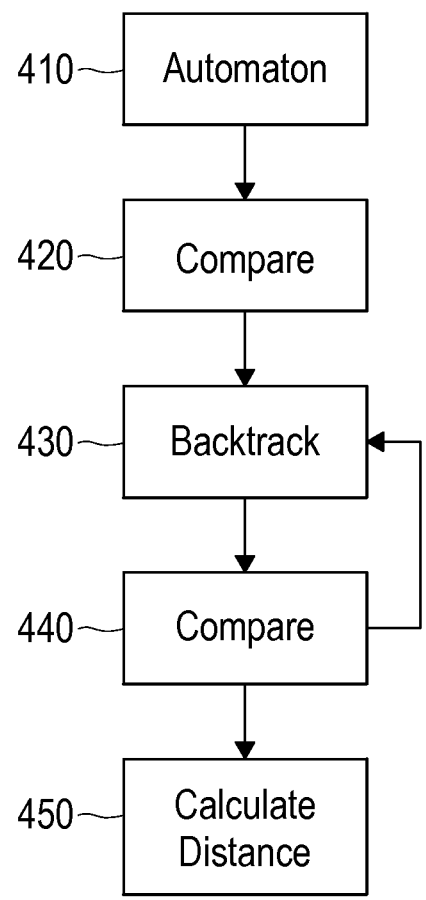
FIG. 4 is a flow chart illustrating a method of comparing a string to a model.

FIG. 4 illustrates regex comparison method 400. In regex comparison method 400, analysis system 100 calculates (1) the similarity of a novel pattern string with a regular expression and (2) a confidence measure for the similarity measurement. Algorithms to compare the similarity of two strings are well known in the art. One such algorithm, the Levenshtein Distance algorithm (which is known in the art), is expanded upon by the disclosed invention in order to compare novel pattern strings to regular expressions. The Levenshtein Distance algorithm calculates the number of characters that must be replaced, inserted, or deleted from a first string in order to convert said first string into a second string. Such number of characters is deemed the Levenshtein Distance.

As opposed to directly comparing two strings, regex comparison method 400 compares a novel pattern string with a regular expression. Regex comparison method 400 finds a comparison string having the smallest Levenshtein Distance of all strings that match said regular expression and have the same length as said novel string.

In automaton step 410, analysis system 100 creates a finite state automaton represented by a regular expression. Regex comparison method 400 then proceeds to first comparing step 420.

In first comparing step 420, analysis system 100 attempts to map a novel pattern string into said finite state automaton. If the final state reached is an accepting state (i.e., the machine reports that the input string, as processed so far, is a member of the language it accepts), then the Levenshtein Distance between the novel pattern string and said regular expression is zero. If the final state reached is not an accepting state, then regex comparison method 400 sets a step value to one and proceeds to backtracking step 430.

In backtracking step 430, analysis system. 100 backtracks in said finite state automaton a number of steps equal to said step value and performs a depth first search up to a depth equal to said step value. Said depth first search finds a number of strings which match part of said regular expression which represents said finite state machine. Regex comparison method 400 then proceeds to second comparing step 440.

In second comparing step 440, analysis system 100 concatenates each of said found strings with a portion of said novel pattern string to form comparison strings of a length equal to the length of said novel pattern string. Analysis system 100 then tests each comparison string with said finite state automaton. For a given comparison string, if the final state reached is an accepting state, then said given comparison string is recorded for use in distance calculating step 450. If the final state reached is not an accepting state for any comparison string, then said step value is incremented by one, and regex comparison method 400 proceeds to backtracking step 430.

In distance calculating step 450, analysis system 100 calculates the Levenshtein Distance of each of said strings recorded for use in second comparing step 440. The minimum Levenshtein Distance of said calculated Levenshtein Distances is the Levenshtein Distance between said novel pattern string and said regular expression.

Figure 5:
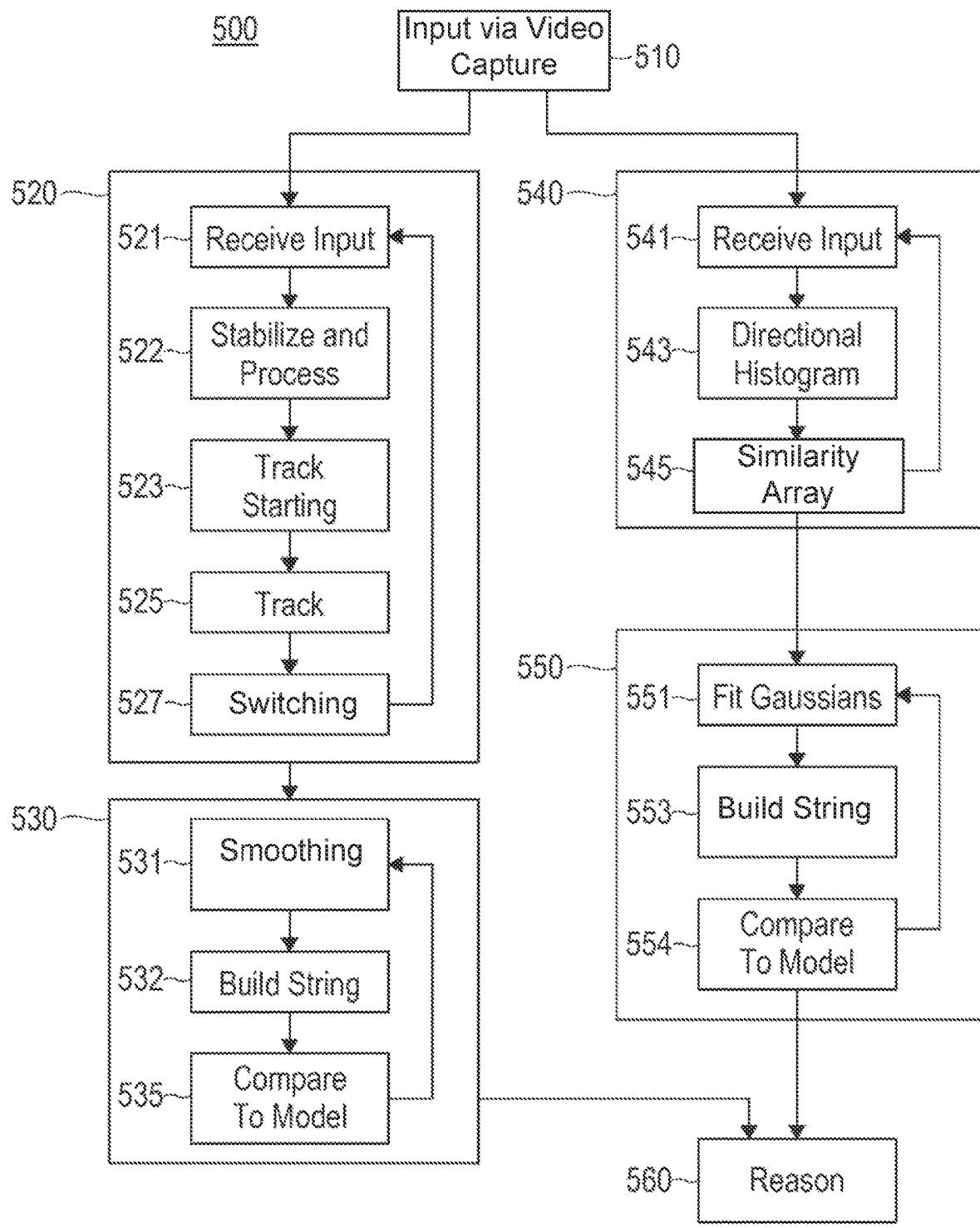
FIG. 5 is a flow chart illustrating a method of analyzing video.

FIG. 5 illustrates surveillance method 500. Surveillance method 500 is comprised of video capturing step 510, tracking step 520 (further comprising input receiving step 521, stabilizing step 522, track starting step 523, track maintaining step 525, and switching step 527), track identifying step 530 (further comprising smoothing step 531, string building step 532, and comparing step 535), periodic motion tracking step 540 (further comprising alternate input receiving step 541, directional histogram creating step 543, and similarity array creating step 545), periodic motion identifying step 550 (further comprising Gaussian fitting step 551, alternate building step 553, and alternate comparing step 554), and reasoning step 560.

In video capturing step 510, analysis system 100 receives an image captured by one or more cameras 205 (which may include, without limitation, cameras 205a-205b) or infrared cameras 206 (which may include, without limitation, infrared cameras 206a-206b) and is transmitted to, and stored within memory 130 or storage medium 120 of one or more analysis systems 100 (which may include, without limitation, analysis systems 100a, 100b, 100c, and 100d). Alternatively, an analysis system 100 may extract an image from a prerecorded video file which may be stored on storage medium 120. Analysis system 100 repeats video capturing step 510 continuously while performing surveillance method 500 to receive a series of time-ordered images, i.e., a video stream.

In tracking step 520, analysis system 100 tracks objects moving in the video stream. Tracking step 520 further comprises several sub-steps.

In input receiving step 521, a sub-step of tracking step 520, analysis system 100 receives an image and stores said image in memory 130.

In stabilizing step 522, a sub-step of tracking step 520, said received image is adjusted to compensate for camera jitter, rotational camera motion, and translational camera motion.

In performing stabilizing step 522, analysis system 100 first performs a Shi-Tomasi edge-finding algorithm (known in the art) on a first image to identify significant feature points in said first image. The Shi-Tomasi algorithm detects features, including, without limitation, corners and edges by approximating the weighted sum of squares of shifted image patches (regions of an image). This approximation results in a vector multiplied by the structure tensor, for which there are two eigenvalues $\lambda_1$ and $\lambda_2$. If either $\lambda_1$ or $\lambda_2$ is large and positive, then an edge or corner is found. Analysis system 100 records the coordinates (x,y) of each found edge or corner (i.e., where $\lambda_1$ or $\lambda_2$ is large and positive) in memory 130. The Shi-Tomasi algorithm is periodically re-applied to identify and store in memory 130 the coordinates (x,y) of edges and corners. In an exemplary embodiment, the Shi-Tomasi algorithm is re-applied once per second or when camera panning exceeds a threshold, and a stabilization module keeps track of camera panning and cumulative drift.

Analysis system 100 then performs a pyramidal Lucas-Kanade algorithm (known in the art) on each subsequent image. The Lucas-Kanade algorithm determines the most likely location in a current image for a point of interest in a prior image. The Lucas-Kanade algorithm solves this problem by determining what is known in the art as optical flow at each point of interest. In the disclosed invention, the Lucas-Kanade algorithm is combined with the Shi-Tomasi edge finding algorithm, using the feature points identified by the Shi-Tomasi edge-finding algorithm as the points of interest of the Lucas-Kanade algorithm.

In applying the Lucas-Kanade algorithm, analysis system 100 determines a two-dimensional translation for each point of interest for R unique rotations within a testing range. Then, analysis system 100 determines the most common translation-rotation pair using a RANSAC algorithm (known in the art), which, in our view, is a faster algorithm than other suitable algorithms which may also be used. For each iteration, random sets of 3 or more feature points are selected. From each set, the corresponding translation (x, y) and rotation θ are determined. The translation and rotation are applied to a larger set of feature points, and an objective function determines the cost of the match. After mat iterations are complete, the image is rotated by $\theta_{min}$ and translated by $(x_{min}, y_{min})$, where $\theta_{min}$, and $(x_{min}, y_{min})$ are the rotation and translation, respectively, with the lowest cost. The image is then rotated by θ and translated by (x, y) to transform each subsequent image into a stabilized image, which analysis system 100 stores in memory 130. Analysis system 100 then proceeds to track starting step 523.

In an exemplary embodiment, the number of points matched for each random iteration is equal to three, the maximum number of iterations is 500, the cost function evaluates a number of transformed points with distance ≤0.05 image size, the number of points to evaluate cost is equal to the number of feature points, and ends matching when the number of points with a low cost ≥0.5*the number of feature points.

In track starting step 523, a sub-step of tracking step 520, new foreground objects are identified. Track starting step encompasses the steps of: Gaussian mixture background subtraction, morphological opening, k-means clustering, spatial filtering, temporal filtering, and adaptive thresholding.

First, analysis system 100 performs the Gaussian mixture (GM) background subtraction algorithm (known in the art) on said stabilized image to identify areas of said stabilized image which are different than expected by a Gaussian mixture model (i.e., not part of the background) and which, by implication, are potentially foreground objects. In applying the Gaussian mixture background subtraction algorithm to said stabilized image, said stabilized image is transformed into a stabilized foreground image that shows only pixels which are in the foreground. In one exemplary embodiment, analysis system 100 transforms said stabilized image into said stabilized foreground image by setting each pixel identified as part of the background to black and by setting each pixel identified as part of the foreground to white.

Next, analysis system 100 performs a morphological opening on said stabilized foreground image to transform said stabilized foreground image into an opened foreground image. As a result of performing said morphological opening, analysis system 100 removes unnecessary noise from said stabilized foreground image.

Pixels in the foreground image are considered to be "in" a set, whereas pixels in the background are "not in" said set. Morphological opening is the dilation of the erosion of a set A (i.e., the set of pixels identified as being different than expected) by a structuring element B. In other words, morphological opening erodes set A by a structuring element B to create an eroded set C, then dilates eroded set C to create opened set D.

In an exemplary embodiment, structuring element B is an object with a diameter of three (3) pixels (which may be a 3 pixel×3 pixel square). In said exemplary embodiment, erosion removes from said stabilized foreground image (in one exemplary embodiment, by setting to zero) any foreground pixels which are not completely surrounded by other foreground pixels, and dilation adds to said stabilized foreground image (in one exemplary embodiment, by setting to a nonzero value) any pixels which have at least one neighboring pixel in the foreground. As a result, noise is removed from said stabilized foreground image (such noise including, without limitation small groups of foreground pixels).

Next, analysis system 100 performs k-means clustering on said opened foreground image to identify k blobs. The k-means clustering algorithm is method of cluster analysis which aims to partition n observations (i.e., pixels as observations of a foreground object at a particular location in the two-dimensional coordinate system of said opened foreground image) into k clusters in which each observation belongs to the cluster with the nearest mean. In other words, foreground objects are grouped into clusters of pixels, and the disclosed invention infers that all of the pixels in the same cluster correspond to the same moving foreground object.

First, k pixels are selected at random from the foreground pixels in said opened foreground image to create k clusters, and the mean of each cluster is the value of the pixel used to create each cluster. Next, each other foreground pixel in said opened foreground image is grouped with the cluster having the closest mean. Then, the mean of each cluster is recalculated, and all foreground pixels in said opened foreground image are again grouped (reclustered) with the cluster having the closest mean. The steps of: recalculating cluster means and reclustering are repeated until reclustering does not change the clusters. Each cluster of pixels is referred to as a blob, and analysis system 100 stores each blob in memory 130.

In an exemplary embodiment, the value of k (i.e., the number of clusters) is chosen adaptively and depends upon the percentage of foreground pixels in the image sequence. For example, if the foreground pixels account for 40% of the total number of image pixels, and assuming that the average size of each blob is around 2% of the total number of image pixels, total number of clusters, k=20, calculated as 40 divided by 2, per the above percentages.

Next, analysis system 100 performs spatial filtering. First, the height, weight, and size of each blob are calculated. Blobs having a size less than $\tau_1$, size greater than $\tau_2$, a height/width ratio of less than $\tau_3$, and a height/width ratio greater than $\tau_4$ pass through the spatial filter and are not removed from processing. All other blobs are not processed further. $\tau_1$, $\tau_2$, $\tau_3$, and $\tau_4$ are thresholds and may be adjusted to achieve different results. However, in an exemplary embodiment, $\tau_1$ is 225 $\tau_2$ is 25 $\tau_3$ is 3 and $\tau_4$ is 0.3.

Next, analysis system 100 performs temporal filtering to calculate a confidence measure 6 for each blob that has passed through the spatial filter. Temporal filtering is performed over successive images. As analysis system 100 identifies a blob in successive images, the confidence that a blob is a novel moving foreground image increases. The confidence metric is calculated by increasing the confidence metric for a given blob for each successive image in which said blob is detected, and reducing the confidence metric for said blob for each successive image in which said blob is not detected.

Confidence is increased or decreased according to whether or not a blob is detected over subsequent frames. In an exemplary embodiment, the equation for confidence gain is:

$$\delta = \delta + 0.5^{-n}$$

and the equation for confidence loss is:

$$\delta = \delta - 0.5^{-n}$$

where n is the number of frames for which the object is continuously detected. (i.e., visible to analysis system 100) or continuously not detected (i.e., not visible to analysis system 100). Thus, $\delta$ should be increased by $0.5^{-n}$ for confidence gain and similarly decreased for the confidence loss.

The composite confidence update equation is:

$$\delta = \delta + ((0.5^{-n}) V (-0.5^{-n}))$$

As an illustrative example, a blob has an initial confidence value of 0, and, if said blob is visible for 3 consecutive frames, and is then not visible for 2 consecutive frames (for a total of 5 consecutive frames), than, the final confidence value, $\delta$, is calculated as follows:

$$\delta = \delta + 0.5^{-n1} - 0.5^{-n2} = 0 + 0.5^{-3} - 0.5^{-2} = 4$$

Next, analysis system 100 performs adaptive thresholding to determine when to start tracking objects. Analysis system 100 maintains a list of blobs which are potentially moving foreground objects, along with each blob's associated confidence metric. As blobs are identified and as blobs identified prior images are re-identified or are not re-identified, the confidence metric for each blob increases or decreases, respectively. If the confidence metric for a blob is greater than $\sigma$, then that blob is deemed a moving foreground object, a track is started for said object using the two-dimensional coordinates (x,y) of the centroid of said blob, and said moving foreground object is tracked in track maintaining step 525. If the confidence metric decreases below τ, then the blob is no longer maintained in the list of blobs which are potentially moving foreground objects. In an exemplary embodiment, σ is 8 and τ is −8. In said exemplary embodiment, a blob can go undetected even for 3 consecutive frames without being removed from the potential blobs list.

As used herein and in the claims, the term "centroid" means the number which is the arithmetic mean of the coordinate values for each pixel in a set of pixels. In exemplary embodiments analysis system 100 calculates and stores the centroid of blobs using floating point data types.

In switching step 527, a sub-step of tracking step 520, analysis system 100 determines the most appropriate tracking algorithm to use given the current circumstances. Analysis system 100 contains a set of six constants ($k_1$, $k_2$, $k_3$, $k_4$, $k_5$, and $k_6$—the sum of $k_1$ through $k_6$ being equal to 1) for each tracking algorithm (said constants are determined based on the characteristics of each tracking algorithm), used by analysis system 100, in connection with currently observed values, to determine which tracking algorithm is most appropriate for the current circumstances. The currently observed values are the stabilization error ($v_1$), track overlap amount ($v_2$), probability of a jump detected ($v_3$), probability of drift detected ($v_4$), high track speed ($v_5$), and low track speed ($v_6$).

In an exemplary embodiment, the values $v_1$-$v_6$ are normalized to have values from 0 to 1. Stabilization error (v1) can be calculated either from a high amount of moving image, e.g. v1=min(1, sum(fgimage)/0.25*imgsize), or from a high percentage of error points from the optical flow algorithm. Track overlap amount (v2) can calculated for each track i=max(area of overlap(track i, track j)/total area), where j≠i. Probability jump detected (v3) can be calculated from a loss of matching color while movement is still detected. Probability drift detected (v4) can be calculated from a loss of matching color and movement. Speed values (v5 and v6) can be calculated as a normalized speed and a normalized constant minus speed, respectively, where the normalization and constant value depend on the expected speed of objects being tracked.

Based on these constants and values, analysis system 100 calculates a performance metric, P, for each tracking algorithm, using the following equation:

$$P=(k_1*v_1)+(k_2*v_2)+(k_3*v_3)+(k_4*v_4)+(k_5*v_5)+(k_6*v_6)$$

On each execution of switching step 527, analysis system calculates a performance metric, $P_{current}$, for the currently selected tracking algorithm. If $P_{current}$ is less than Φ, then analysis sytem 100 proceeds to track maintaining step 525. Otherwise, the current state is saved, P is calculated for each other tracking algorithm, and the algorithm having the lowest P value is selected. Then, analysis system 100 transmits said saved current state to said newly selected tracking algorithm. The state is a set of tuples (x,y,n,l) where x and y are coordinates of the center or the centroid of tracked objects, n is the frame number, and l is intensity. Since tracking is occurring in real-time, in our view, a limited number of frames need to be saved, the number depending on the latency of the tracking algorithms and the frequency of switching. In one exemplary embodiment, 100 frames of history are saved.

In an alternative embodiment, the object size may also be included in the tuple.

In track maintaining step 525, a sub-step of tracking step 520, analysis system 100 tracks each moving foreground object using the tracking algorithm selected during the most recent invocation of switching step 527. Analysis system 100 applies the selected tracking algorithm to associate recently tracked moving foreground objects with each moving foreground object for the current image. Analysis system 100 also calculates, the current tracked location of each moving foreground object (i.e., the two-dimensional coordinates (x,y) of the centroid of each moving foreground object). Then, analysis system 100 records in memory 130 the current tracked location of each moving foreground object in association with prior tracked locations for each moving foreground object, such that the tracked path of each object is preserved. In other words, in track maintaining step 525, analysis system 100 produces a list of unique moving foreground objects and their current tracked location. In repeated performance of track maintaining step 525, analysis system 100 appends the current tracked location of each unique moving foreground object to the list of prior tracked locations for each unique moving foreground object. Accordingly, the list of prior and current tracked locations for a given unique moving foreground object is the tracked path for said unique moving foreground object.

Switching step 527 may not be performed for each processed image, and in an exemplary embodiment, switching step 527 is performed once every 30 images. Also, in an exemplary embodiment, Φ is 0.5, but in variations of said exemplary embodiment, the value of Φ varies based on the values of constants $k_1$ through $k_6$.

In an exemplary embodiment, analysis system 100 selects the most appropriate tracking algorithm from the following algorithms: GM background subtraction with mean shift (with $k_i=k_3=k_6=0.3$; $k_2=0.1$; $k_4=k_5=0$), Lucas-Kanade (LK) optical flow (with $k_1=k_2=k_3=0$; $k_4=0.5$; $k_5=k_6=0.25$), and color-histogram using mean shift (described in more detail below) (with $k_1=k_6=0$; $k_2=k_3=0.25$; $k_4=0.4$; $k_5=0.1$). Any number of tracking algorithms may be used.

In track identifying step 530, analysis system 100 compares each tracked path to one or more models created according to model building method 300. If a tracked path is close enough to a model, then analysis system 100 has identified said tracked path, and the result of said comparison is stored in memory 130. The sub-steps of track identifying step 530 (smoothing step 531, string building step 532, and comparing step 535) are performed for each tracked path.

In smoothing step 531, a sub-step of track identifying step 530, analysis system 100 transforms a tracked path into a smoothed path using a filtering method. We speculate that low-pass filters are preferred. In one exemplary embodiment, analysis system 100 transforms said tracked path into a smoothed path using a simple Gaussian filter with a sampling window of 20 and a standard deviation (σ), where the standard deviation value is dependent on the amount and intensity of background noise in the image.

In string building step 532, a sub-step of track identifying step 530, said tracked path is converted into a path string. In an exemplary embodiment, analysis system 100 uses the characters and mappings described in the description of FIG. 3 to transform said tracked path into a path string.

Said tracked path contains a series of tracking coordinates for a foreground object. Each pair of coordinates corresponds to the position of a tracked object in a given image. Where the movement between successive images (i.e., the distance between two successive tracked coordinate pairs is equal to one pixel, then such motion is converted into the appropriate character and is appended to a path string (which string is initially empty).

One embodiment of the disclosed invention uses the Lucas-Kanade pyramidal flow algorithm (known in the art), which inherently returns values in the subpixel level. Accordingly, returned (x,y) values are floating point values. Motion of more than one pixel is handled at higher pyramid levels, where the image is scaled down (and, as a scaled image, motion contained therein is viewed as subpixel).

Where the movement between successive images is less than one pixel, then analysis system 100 must determine whether or not such motion should be mapped into a character. Accordingly, analysis system 100 proceeds as follows.

Each tracked position (as tracked in track maintaining step 525) has a previous tracked position ($x_{previous}$, $y_{previous}$). For the first tracked position, the previous tracked position is the initial track as calculated in track starting step 523.

For each subsequent tracked position ($x_{current}$, $y_{current}$), analysis system 100 calculates a current slope between the two points ($x_{previous}$, $y_{previous}$) and ($x_{current}$, $y_{current}$). Said current slope is then compared to the slope of the eight possible movement directions described in FIG. 3. Analysis system 100 selects a first candidate direction and a second candidate direction. Said first candidate direction and said second candidate direction are the two movement directions having the closest slope to said current slope. A vector in said first candidate direction of length l is added to ($x_{previous}$, $y_{previous}$) to calculate ($x_{first}$, $y_{first}$), and a vector in said second candidate direction of length l is added to ($x_{previous}$, $y_{previous}$) to calculate ($x_{second}$, $y_{second}$). Analysis system 100 calculates: (a) the distance between ($x_{previous}$, $y_{previous}$) and ($x_{first}$, $y_{first}$) as $d_{first}$; (b) the distance between ($x_{previous}$, $y_{previous}$) and ($x_{second}$, $y_{second}$) as $d_{second}$; and, (c) the distance between ($x_{current}$, $y_{current}$) and ($x_{previous}$, $y_{previous}$) as $d_{nil}$. If $d_{nil}$ is the smallest distance of distances $d_{nil}$, $d_{first}$, and $d_{second}$, then no character is appended to said path string. If $d_{first}$ or $d_{second}$ is the smallest distance of distances $d_{nil}$, $d_{first}$, and $d_{second}$, then a character corresponding to said first direction (if $d_{first}$) or said second direction (if $d_{second}$), respectively, is appended to said path string. Analysis system 100 then proceeds to the next tracked position, continuing to append characters to said path string according to string building step 532.

In comparing step 535, a sub-step of track identifying step 530, said path string for each tracked object is compared, according to regex comparison method 400, to one or more models as created by model building method 300. Analysis system 100 then stores the result of said comparison in memory 130.

In periodic motion tracking step 540, analysis system 100 extracts information from said stabilized foreground image and compares said extracted information to information extracted from prior stabilized foreground images to create a data structure representing motion. Analysis system 100 then analyzes said data structure to identify periodic motion. Periodic motion tracking step proceeds according to the following sub-steps (alternate input receiving step 541, directional histogram creating step 543, and similarity array creating step 545).

In alternate input receiving step 541, a sub-step of periodic motion tracking step 540, analysis system 100 receives an image and stores said image in memory 130.

In directional histogram creating step 543, a sub-step of periodic motion tracking step 540, analysis system 100 creates one or more directional histograms from said image received by alternate input receiving step 541. A directional histogram is a one dimensional array where each element contains the mean intensity value for a row or column of pixels. In an exemplary embodiment, analysis system 100 creates six directional histograms: a first directional histogram of a first half of said image along a horizontal axis, a second directional histogram of said first half of said image along a vertical axis, a third directional histogram of a second half of said image along said horizontal axis, a fourth directional histogram of said second half of said image along said vertical axis, a fifth directional histogram of said image along said horizontal axis, and a sixth directional histogram of said image along said vertical axis. Analysis system 100 stores each of said directional histograms in memory 130. The remaining sub-steps of periodic motion tracking step 540 are performed for each of said directional histograms.

In similarity array creating step 545, a sub-step of periodic motion tracking step 540, analysis system 100 creates a similarity array which is a time-ordered series of difference values, each difference value corresponding to a difference between two directional histograms created in directional histogram creating step 543. As stated above, each directional histogram is an array. In similarity array creating step 545, analysis system 100 calculates the root mean square deviation ("RMSD" and also known as the root mean square error ("RMSE")) of a current directional histogram with one or more prior directional histograms, storing each result in said similarity array in time order.

The RMSD for a first directional histogram, $\theta_1$, with respect to a second directional histogram, $\theta_2$, is defined as follows:

$$\theta_1 = \begin{bmatrix} x_{1,1} \\ x_{1,2} \\ \vdots \\ x_{1,n} \end{bmatrix} \text{ and } \theta_2 = \begin{bmatrix} x_{2,1} \\ x_{2,2} \\ \vdots \\ x_{2,n} \end{bmatrix}.$$

$$RMSD(\theta_1, \theta_2) = \sqrt{MSE(\theta_1, \theta_2)} = \sqrt{E((\theta_1 - \theta_2)^2)} = \sqrt{\frac{\sum_{i=1}^{n}(x_{1,i} - x_{2,i})^2}{n}}.$$

If the RMSD between two directional histograms is low, we infer that the two images (or sub-regions of interest in two images) are similar.

In an exemplary embodiment, analysis system 100 retains a directional histogram for the 150 immediately-preceding images. Analysis system 100 then calculates RMSD of said current directional histogram with respect to each of said 150 retained directional histograms, and stores each calculated RMSD in said similarity array ordered in the time sequence of said retained directional histograms.

In periodic motion identifying step 550, analysis system 100 analyzes said similarity array to identify periods of increasing and decreasing similarity between directional histograms. Analysis system 100 then translates said identified periods into a string, which is compared to a model. Periodic motion identifying step is comprised of the following sub-steps (Gaussian fitting step 551, alternate building step 553, and alternate comparing step 554).

In Gaussian fitting step 551, a sub-step of periodic motion identifying step 550, analysis system 100 fits one or more Gaussian distribution functions to data in said similarity array. As stated above, each element in said similarity array is a RMSD between two directional histograms, and each index of said similarity array corresponds to the order of said RMSD values. Thus, each element of said similarity array may be plotted on a two dimensional graph (having a horizontal x-axis and a vertical y-axis) using the index of the similarity array as the x coordinate (also corresponding to time) and the RMSD value at each index as the y coordinate.

To perform Gaussian fitting step 551, analysis system 100 first segments said similarity array into one or more segments by identifying local minima.

In an exemplary embodiment, analysis system 100 segments said similarity array by iterating through each element in said similarity array, viewing a current element (the i$^{th}$ element), a next element (the i+1 element), and a subsequent element (the i+2 element). If said current element is less than 0.95 multiplied by the largest element seen in the current iteration (i.e., it is not near a local maxima), and if said next element is less than said current element and said subsequent element, then said current element is considered the last element in the current segment, and said next element is the first element in a next segment.

Next, analysis system 100 fits a Gaussian distribution to the data in each of said one or more segments. For each segment as a current segment, analysis system 100 first removes each element in said current segment having a value less than a filtering constant multiplied by the largest value in said current segment. In an exemplary embodiment, said filtering constant is 0.2. Thus, any "low" values are removed from said current segment to create a current filtered segment.

After creating said current filtered segment, analysis system 100 fits a second degree polynomial to the natural log of said current filtered segment. In an exemplary embodiment, analysis system 100 uses the polyfit(x,y,n) function of the Matlab brand software product, where x is an array of indexes to said similarity array for said current segment, y is an array of the natural log of each value in said similarity array for said indexes for said current segment, and n is 2.

Thus, if a function $f(x)=ax^2+bx+c$ describes the data in said current filtered segment, analysis system 100 takes the natural log of f(x) as $p(x)=\ln(ax^2+bx+c)$. Next, using numerical methods, analysis system 100 calculates the best fitting coefficients a, b, and c for p(x).

Analysis system 100 assumes that the data is a Gaussian distribution, and maps coefficients a, b, and c into the Gaussian function, $$f(x) = Ae^{\frac{-(x-\mu)^2}{2\sigma^2}}.$$

Thus, analysis system calculates σ as equal to $$\sqrt{\frac{-1}{2a}},$$

where a is the second order polynomial coefficient as described above. A periodicity value P is calculated for each segment as $P=\sigma\sqrt{2\pi}$. Thus, analysis system 100 assigns a periodicity value to each segment.

In alternate building step 553, a sub-step of periodic motion identifying step 550, said periodicity values for each segment are mapped to a periodic motion string using simple thresholding. First, analysis system 100 creates a plurality of ranges of approximately equal size. Second, analysis system 100 assigns a character to each of said plurality of ranges. Third, analysis system 100 creates a periodic motion string by appending a character to an initially empty string for each of said segments. Each of said segments falls within one of said plurality of ranges, and each appended character is the character associated with the range within which the current segment falls.

In an exemplary embodiment, ranges of approximately 5 or 6 are used. So, values between 20 and 25 are mapped to the character, "a"; 26 through 30 to "b"; and 31-35 to "c" and so on. Thus, in said exemplary embodiment, periodicity values 30.2, 28.6, 22.1, and 24.5 are mapped to the string, "cbaa."

In alternate comparing step 554, a sub-step of periodic motion identifying step 550, each said periodic motion string calculated in alternate building step 553 compared, according to regex comparison method 400, to one or more models created via model building method 300. Analysis system 100 then stores the result of said comparison in memory 130.

In reasoning step 560, analysis system 100 evaluates information, including without limitation, tracked paths, path strings (and stored comparisons), periodic motion, periodic motion strings (and stored comparisons) to identify patterns of activity. Analysis system 100 uses abductive reasoning, along with linear temporal logic and Bayesian networks to identify probable activity.

Linear Temporal Logic (LTL) is a modal temporal logic with modalities referring to time (and is known in the art). Analysis system 100 uses LTL to encode formulae about future of paths of tracked objects and to represent real-world entities in the formal language used for instantiating model checking clauses. In our view, the advantage of using Linear Temporal Logic in modeling surveillance videos lies in the fact that each video frame can be shown to be logically related to the previous and next frames with relations that can be represented in the temporal domain. The clauses of LTL used in the disclosed invention are:

X$\phi\to\phi$ holds at the next instant;
G$\phi\to\phi$ holds on the entire subsequent path; and
F$\phi\to\phi$ eventually has to hold (somewhere on the subsequent path)

An object's spatial location is marked by the 2-tuple (x,y) representing the pixel coordinates of its centroid. In an exemplary embodiment, analysis system 100 uses a 2-tuple (x,y) comprised of integers to represent the pixel coordinates of an object's spatial location.

The first step in our approach is to map the surveillance video frames to Linear Temporal Logic. Analysis system 100 uses the following logical functions to map information into the LTL domain.

isAt($t_i$, $O_j$, $L_k$)→Object $O_j$ is at location $L_k$ at time instant $t_i$ where $t_i$ belongs to the finite domain.
isClose($\varepsilon_i$, $\varepsilon_j$)→Entities $\varepsilon_i$ and $\varepsilon_j$ are in close proximity to each other, defined by a threshold τ (close proximity is defined in terms of the unit in which the entities are defined) which may be Euclidean distance, appearance labels, or just the magnitude.
isLinear($V_i$)→Object $O_i$ has a velocity $V_i$ that is linear for a certain period of time within a pre-defined threshold.
Mag($V_i$)→Magnitude of the velocity of Object $O_i$.

Linear Temporal Logic permits use of the concept of logical abduction. Abduction (akin to deduction and induction) is a logical reasoning framework in which an explanation a for an observation b is derived by presuming that a may be true because then b would eventually follow. Thus, to abduce a from b involves determining that the occurrence of a is sufficient (or nearly sufficient) for the eventual occurrence of b, but not necessary for b to occur. Moreover, in many cases, abduction involves identifying the most probable explanation based on an observation.

Accordingly, analysis system 100 combines LTL with abduction to identify patterns of activity. Given a theory T (in LTL) describing normal/abnormal behavior in an environment and a set of observations O, analysis system 100 uses an abduction engine to compute a set Σ of LTL formulas which are both possible explanations for O and are consistent with T. A probability distribution on the set Σ (also called a belief state) is used to determine the most likely explanation.

Analysis system 100 calculates such probability distribution using a Bayesian network (Bayesian statistics, Bayesian networks, and Bayes' theorem are known in the art). Sensors, tracking systems, and atomic action recognition systems may provide or calculate information along with probability or confidence metrics. Analysis system 100 uses such probability or confidence metrics in connection with Baysian techniques to abduce the most likely explanation for O consistent with T.

In an exemplary embodiment, analysis system 100 contains a set of predefined prior probabilities, said prior probabilities having been calculated using the prior probabilities of all actions $A_i$ that can eventually lead to a particular observation O, selecting the $A_i$ with maximum a priori probability.

For the purpose of teaching the disclosed invention, we describe the events "Occlusion" as "Human Entering Vehicle" as $E_2$, and "Burglary or Escapade" as $E_3$. Occlusion occurs if at time Object $O_j$ is at location $L_k$ and at the next instant, the object is not visible at any location $L_k$ close to $L_j$. A human entering a vehicle is detected at time $t_i$ if an Object $O_i$ at location $L_k$ belongs to the set of humans while there exists another object $O_j$ close to it that belongs to the set of ears, and at the next instant of time, the human is not visible near the previous location. Burglary or escapade is a composite event detected when one or more of the aforementioned events occur in the course of time with other atomic events of interest (e.g., carrying an object, velocity of a car exceeding a first threshold or velocity of a human exceeding a second threshold).

$E_1$, $E_2$, and $E_3$ are defined as follows:

$E_1 \rightarrow isAt(t_i, O_j, L_k) \char`\^ G([\forall j]: isClose(L_j, L_k) \char`\^ \neg isAt(t_{i+}, O_j, L_j) \char`\^ t_{i+} \Rightarrow X\ t_i)$ $E_2 \rightarrow isAt(t_p, O_i, L_t) \char`\^ isAt(t_p, O_j, L_k) \char`\^ (O_i \in H) \char`\^ (O_j \in C) \char`\^ isClose(L_j, L_k) \char`\^ [\forall m: isClose(L_m, L_m, L_r) \char`\^ \neg isAt(t_{p+}, O_j, L_m)] \char`\^ t_{p+} \Rightarrow X\ t_p$ $E_3 \rightarrow O_i \in H \char`\^ (Mag(V_i) > T_1) \char`\^ H_O$ detected $\char`\^ E_2 \char`\^ X\ (O_j \in C) \char`\^ F\ (Mag(V_j) > T_2)$ where, $T_1 \rightarrow$ Threshold for Human velocity;
$T_2 \rightarrow$ Threshold for car velocity; and
$H_O \rightarrow$ Human carrying object.

With such descriptions, the probability of a burglary or escapade of a bank (designated by the label B) or an antique/jewelry shop (designated by the label AS) can be written as:

P(E=Burglary/Escapade)=P(F (isAt($t_i$, $L_i$, B)ˆisAt($t_i$, $L_i$, AS)))ˆP($E_3$)

Here, P(F (isAt($t_i$, $L_i$, B)))=dist($L_i$-PL) and P(F (isAt($t_i$, $L_i$, AS)))=dist($L_i$-AS). $E_3$ denotes the deterministic event presented above, and F denotes the "eventually" clause in LTL. P(Mag($V_i$)>Threshold $T_1$) is defined as equal to 1 when Mag($V_i$)>Threshold $T_1$ and equal to 0 otherwise. P($H_O$ detected) is a probability value obtained from a template matching algorithm that returns both an appearance label and the human carrying object.

Generally, template matching algorithms use digital image processing to find features in an image which match features in one or more a templates, with each template being associated with a composite object. Composite objects are identified by finding a template that most closely matches said features. For example, a template matching algorithm might identify hands, feet, legs, and faces as features, which can then be matched to a template associated with a human.

A Bayesian network is a directed acyclical graph comprised of a plurality of nodes and may also be known as a belief network or a probabilistic causal network. Bayesian networks capture believed relations (which may be uncertain, stochastic, or imprecise) between a set of variables, which are relevant to a problem. They might be relevant because they will be Observable, because their value is needed to take some action or report some result, or because they are intermediate or internal variables that help express the relationships between other variables. Each node in a Bayesian Network represents a scalar variable which may be discrete, continuous or propositional.

After finding said set Σ of LTL formulae which are both possible explanations for O and are consistent with T, analysis system 100 examines each LTL formula to form one or more Bayesian networks, the nodes of each Bayesian network representing events from each LTL formula and the directional edges of each Bayesian network representing the conditional probabilities of each event in each child node given the occurrence of each parent node. Then, analysis system 100 evaluates each Bayesian network to find the most probable.

To summarize, given a theory T (in LTL) describing normal/abnormal behavior in an environment and a set of observations O, analysis system 100 uses an abduction engine to compute a set Σ of LTL formulas which are both possible explanations for O and are consistent with T. Analysis system 100 then calculates the most likely of the possible explanations using a Bayesian network, thus abducing a conclusion from the set of observations O.

Figure 6:
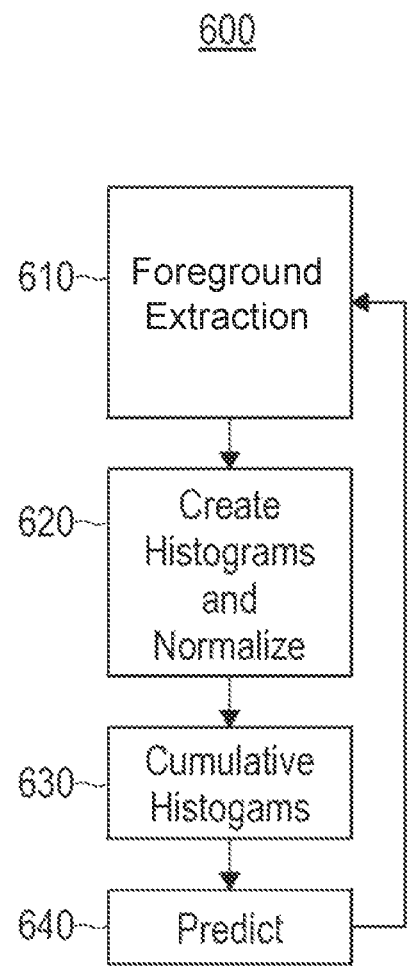
FIG. 6 is a flow chart illustrating a method of tracking objects using color histograms.

FIG. 6 illustrates color histogram method 600. Color histogram method 600 attempts to extract one or more foreground objects from a current image of a video stream.

In foreground extraction step 610, analysis system 100 identifies pixels in the foreground of a current image using a Gaussian mixture background subtraction method. Analysis system 100 then proceeds to histogram creating step 620.

In histogram creating step 620, analysis system 100 creates a foreground color histogram and a background color histogram for said current image. Each pixel in the foreground of said current image, as identified in foreground extraction step 610, is used to generate a foreground color histogram. Each pixel not in the foreground of said current image is used to generate a background color histogram. Each pixel contains three color values (R,G,B) in the range of 0-255. For the purposes of creating said foreground color histogram and said background color histogram, color values are binned, or condensed, into 32 possible values. For example, bin (0,0,0) contains R=0-7, G=0-7, and B=0-7. In other words, each pixel value is divided by 8 (without remainder), and the bin for the appropriate histogram foreground vs. background) corresponding to the resulting RGB value is incremented by one. Finally, analysis system 100 normalizes data in each bin to the number of pixels in the foreground by multiplying each value in each bin of said background color histogram by the total number of pixels in the foreground of said current image divided by the total number of pixels in the background of said current image. Analysis system 100 then proceeds to cumulating step 630.

In cumulating step 630, analysis system 100 generates a cumulative foreground histogram and a cumulative background histogram using a moving average of foreground color histograms and background color histograms, respectively. In an exemplary embodiment, moving average is an exponential moving average. Analysis system 100 then proceeds to predicting step 640.

In predicting step 640, analysis system 100 uses said cumulative foreground histogram and said cumulative background histogram to predict whether each pixel in said current image is in the foreground or the background. This prediction does not directly consider whether each pixel was previously considered part of the foreground per foreground extraction step 610. Rather, in predicting step 640, analysis system 100 uses Bayes' theorem to predict the probability that each pixel is in the foreground. If such probability for a given pixel P(x,y) is greater than N, then P(x,y) color histogram method 600 considers P(x,y) to be in the foreground. In an exemplary embodiment, N is equal to 0.5.

Probability Image

In the equation given below, a probability image is formed using a conical shape.

$$Prob(x, y) = \max - (\max - \min) \times \sqrt{\left(\frac{x-c_x}{c_x}\right)^2 + \left(\frac{y-c_y}{c_y}\right)^2}$$

As evident from the equation, $$\sqrt{\left(\frac{x-c_x}{c_x}\right)^2 + \left(\frac{y-c_y}{c_y}\right)^2}$$

represents the equation of a circle that defines said conical shape. So, any point in the probability image has a value weighted by the confidence where the center of the ROI has the highest confidence and the edges have the lowest confidence.

Motion Image

The motion image is an image that gives the positions of all the moving pixels in the image sequence. This image is obtained using the Gaussian Mixture Background Subtraction method. The background subtraction method builds a background model of Gaussians, with a mean and standard deviation for each pixel. If the value of a pixel is not within the range predicted by the background model, the pixel is considered to be m the foreground image. Pixels in the foreground image are considered to represent moving objects which are not occluded by stationary objects.

Occlusion Detection

In a video tracking system, tracked objects may pass behind stationary objects or may otherwise be occluded from view. It is an aspect of the disclosed invention to detect when objects are occluded, then adjust inferences about tracked object velocity and position using occlusion detection. For example, as an object becomes occluded, its size may appear o become smaller and its tracked position (centroid) may not change over several frames. Thus, the object will appear to become smaller (as more of the pixels become occluded) and to decrease in velocity (because the average (x,y) will stay relatively fixed as pixels become occluded), when, in fact, the object is continuing at a fixed velocity. If, however, occlusion is detected, then the system can compensate and more accurately track the object.

The occlusion detection algorithm defines a parameter called occval that describes the ratio of the number foreground pixels that match the object in the previous frame to the number of background pixels that match the object. If the occval value falls below a threshold, then occlusion is detected. Our invention defines a framework for tracking an object and analyzing the tracks for event detection at a later stage. This framework uses the concept of occlusion to maintain a track on an object even when it becomes occluded or partially occluded.

An aspect of the disclosed invention is the combination of the probability image, the color histogram, the motion image, occlusion detection, and other methods or techniques disclosed herein, in order to more accurately and reliably track objects in video streams.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the allowed claims and their equivalents.

Embodiments of analysis system 100, surveillance system 200, model building method 300, regex comparison method 400, surveillance method 500, and color histogram method 600 and/or components of any thereof, can be implemented in hardware and/or software and any combination thereof as understood by one skilled in the art. Further, it will be obvious to those having skill in the art that many changes may be made to the details of the above-described embodiments without departing from the underlying principles of the invention. For example, any suitable combination of the components of analysis system 100, surveillance system 200, model building method 300, regex comparison method 400, surveillance method 500, and color histogram method 600 is possible. The scope of the present invention should, therefore, be determined only by the following allowed claims.

What is claimed is:

1. A computer system for identifying an activity, event, or chain of events in a video system, the computer system comprising:
   a computer containing a plurality of software modules,
   a video stream input, and
   wherein the plurality of software modules include
      a video capturing module;
      an object tracking module;
      a track identification module;
      a periodic motion tracking module;
      a periodic motion identifying module; and
      a reasoning module;
   wherein
      the video capturing module receives images from a video stream and outputs image data directly to both the object tracking module and the periodic motion tracking module;

the object tracking module receives the image data from the video capturing module and produces a tracked path of an object in the video stream based on the image data; and the track identification module receives the tracked path from the object tracking module and performs a comparison of the tracked path to a model;

the periodic motion tracking module receives the image data from the video capturing module and creates and outputs a data structure representing motion;

the periodic motion identifying module identifies periodic motion and non-periodic motion within the image data based on the output from the periodic motion tracking module; and the reasoning module receives both the comparison from the track identification module and data regarding the identification of periodic motion and non-periodic motion from the periodic motion identifying module, and based thereon the reasoning module identifies motion characteristics of the activity, event, or chain of events.

2. The computer system according to claim 1, herein the video stream input includes a camera configured to detect light in a visible spectrum and/or an infrared spectrum.

3. The computer system according to claim 1, wherein the video stream input is configured to receive the video stream from a hardware memory having prerecorded video data stored thereon.

4. The computer system according to claim 1, wherein the object tracking module
- identifies the object in the video stream based on said received image data;
- selects a tracking algorithm; and
- tracks the object using the tracking algorithm and starts a track.

5. The computer system according to claim 1, wherein the periodic motion tracking module extracts information from a stabilized foreground image and compares said extracted information to information extracted from prior stabilized foreground images to create the data structure representing motion.

6. The computer system according to claim 1, wherein the periodic motion identifying module identifies periodic motion and non-periodic motion includes analyzing a similarity array and identifying periods of increasing and decreasing similarity between directional histograms.

7. The computer system according to claim 6, wherein the periodic motion identifying module identifies periodic motion and non-periodic motion includes fitting one or more Gaussian distribution functions to data in the similarity array.

8. The computer system according to claim 1, wherein the periodic motion identifying module identifies periodic motion and non-periodic motion includes mapping periodicity values to a periodic motion string using thresholds.

9. The computer system according to claim 1, wherein the object tracking module is configured to detect an occlusion of the object and compensate for the detected occlusion.

10. The computer system according to claim 1, wherein the reasoning module identifies motion characteristics of the activity, event, or chain of events based on a one or a combination of a determined probability image, a color histogram, a motion image, and an occlusion detection.

11. A method for identifying an activity, event, or chain of events in a video system, the method being implemented by a computer system containing a plurality of software modules and a video stream input, the method comprising:

receiving by a video capturing module images from a video stream and outputting by the video capturing module image data directly to both an object tracking module and a periodic motion tracking module;

receiving by the object tracking module the image data from the video capturing module and producing by the object tracking module a tracked path of an object in the video stream based on the image data;

receiving by a track identification module the tracked path from the object tracking module and performing by the track identification module a comparison of the tracked path to a model;

receiving by the periodic motion tracking module the image data from the video capturing module and creating and outputting by the periodic motion tracking module a data structure representing motion;

identifying by a periodic motion identifying module periodic motion and non-periodic motion within the image data based on the output from the periodic motion tracking module; and receiving by a reasoning module both the comparison from the track identification module and data regarding the identification of periodic motion and non-periodic motion from the periodic motion identifying module, and based thereon identifying by the reasoning module motion characteristics of the activity, event, or chain of events.

12. The method according to claim 11, wherein the video stream is received by a video stream input that includes a camera configured to detect light in a visible spectrum and/or an infrared spectrum.

13. The method according to claim 11, wherein the video stream is received from a hardware memory having prerecorded video data stored thereon.

14. The method according to claim 11, wherein producing the tracked path by the object tracking module includes
- identifying the object in the video stream based on said received image data;
- selecting a tracking algorithm; and
- tracking the object using the tracking algorithm and starts a track.

15. The method according to claim 11, wherein the periodic motion tracking module extracts information from a stabilized foreground image and compares said extracted information to information extracted from prior stabilized foreground images to create the data structure representing motion.

16. The method according to claim 11, wherein the periodic motion identifying module identifies periodic motion and non-periodic motion includes analyzing a similarity array and identifying periods of increasing and decreasing similarity between directional histograms.

17. The method according to claim 16, wherein the periodic motion identifying module identifies periodic motion and non-periodic motion includes fitting one or more Gaussian distribution functions to data in the similarity array.

18. The method according to claim 11, wherein the periodic motion identifying module identifies periodic motion and non-periodic motion includes mapping periodicity values to a periodic motion string using thresholds.

19. The method according to claim 11, wherein the object tracking detects an occlusion of the object and compensates for the detected occlusion.

20. One or more non-transitory computer-readable media having stored thereon executable instructions that when executed by one or more processors of a computer system configure the computer system to perform at least the following:

receive by a video capturing module of the computer system images from a video stream and output by the video capturing module image data directly to both an object tracking module of the computer system and a periodic motion tracking module of the computer system;

receive by the object tracking module of the computer system the image data from the video capturing module and produce by the object tracking module a tracked path of an object in the video stream based on the image data;

receive by a track identification module of the computer system the tracked path from the object tracking module and perform by the track identification module a comparison of the tracked path to a model;

receive by the periodic motion tracking module the image data from the video capturing module, and create and output by the periodic motion tracking module a data structure representing motion;

identify by a periodic motion identifying module of the computer system periodic motion and non-periodic motion within the image data based on the output from the periodic motion tracking module; and receive by a reasoning module of the computer system both the comparison from the track identification module and data regarding the identification of periodic motion and non-periodic motion from the periodic motion identifying module, and based thereon identify by the reasoning module motion characteristics of an activity, event, or chain of events.

* * * * *